United States Patent
Kempe et al.

(10) Patent No.: US 7,617,091 B2
(45) Date of Patent: *Nov. 10, 2009

(54) METHOD AND APPARATUS FOR PROCESSING NATURAL LANGUAGE USING TAPE-INTERSECTION

(75) Inventors: Andre Kempe, Grenoble (FR); Franck Guingne, Grenoble (FR); Florent Nicart, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 736 days.

This patent is subject to a terminal disclaimer.

(21) Appl. No.: 10/849,919

(22) Filed: May 21, 2004

(65) Prior Publication Data
US 2005/0108000 A1    May 19, 2005

Related U.S. Application Data

(60) Provisional application No. 60/481,639, filed on Nov. 14, 2003.

(51) Int. Cl.
*G06F 17/27* (2006.01)
(52) U.S. Cl. .............. 704/9; 704/1; 704/10; 707/2; 707/3; 707/4; 707/5; 707/6
(58) Field of Classification Search .......... 704/1, 704/9, 10; 707/1–6
See application file for complete search history.

(56) References Cited

U.S. PATENT DOCUMENTS

| 5,594,641 | A * | 1/1997 | Kaplan et al. ............ 707/1 |
| 5,642,522 | A | 6/1997 | Zaenen et al. ............ 395/794 |
| 7,010,476 | B2 * | 3/2006 | Karttunen et al. ........ 704/1 |
| 7,257,575 | B1 * | 8/2007 | Johnston et al. .......... 707/4 |
| 7,383,185 | B1 * | 6/2008 | Mohri ...................... 704/251 |
| 2003/0004705 | A1 | 1/2003 | Kempe ..................... 704/9 |
| 2004/0117184 | A1 | 6/2004 | Privault et al. ............ 704/251 |
| 2004/0128122 | A1 | 6/2004 | Privault et al. ............ 704/4 |

FOREIGN PATENT DOCUMENTS

EP    1531400 A3    3/2006

OTHER PUBLICATIONS

Mohri, M. et al., "Weighted Finite-State Transducers In Speech Recognition", Computer Speech And Language, vol. 16, No. 1, pp. 69-88, Jan. 2002.

Reape, M. & Thompson, H., "Parallel Intersection And Serial Composition Of Finite State Transducers", Proceedings Of The 12th Conference On Computational Linguistics, pp. 535-539, Aug. 1988.

Kempe, A. et al., "Algorithms For Weighted Multi-Tape Automata", XRCE Research Report, vol. 2004. No. 031, Jun. 2004, pp. 1-28.

Mohri, M., Pereira, F. & Riley, M., "The Design Principles Of A Weighted Finite-State Transducer Library", Theoretical Computer Science, vol. 231, No. 1, pp. 17-32, Jan. 2000.

(Continued)

*Primary Examiner*—Talivaldis I Smits
*Assistant Examiner*—Lamont M Spooner
(74) *Attorney, Agent, or Firm*—Fay Sharpe LLP

(57) ABSTRACT

Operations for weighted and non-weighted multi-tape automata are described for use in natural language processing tasks such as morphological analysis, disambiguation, and entity extraction.

18 Claims, 17 Drawing Sheets

OTHER PUBLICATIONS

Kempe, A., "Extraction of epsilon-Cycles From Finite-State Transducers", Lecture Notes In Computer Science, vol. 2494, pp. 190-201, 2002.

Eilenberg, Samuel, "Automata, Languages, and Machines", vol. A. Academic Press, San Diego, CA, USA, 1974: Chapter 1, Section 3 "Monoids", pp. 3-6; Chapter 6, Section 1 "Multiplicity in Automata", pp. 120-122; and Chapter 6, Section 2, "Semirings", pp. 122-126.

Eisner, Jason, "Parameter Estimation For Probabilistic Finite-State Transducers", In Proceedings of the 40th Annual Meeting, pp. 1-8, Philadelphia, PA, USA, 2002.

Elgot, C.C. And J.E. Mezei, "On Relations Defined by Generalized Finite Automata", IBM Journal Res. 9, pp. 47-68, 1965.

Kaplan, Ronald M. And Martin Kay, "Regular Models Of Phonological Rule Systems", Computational Linguistics, 20(3):331-378, 1994.

Karttunen, Lauri, "The Replace Operator", Proceedings of the 33rd Annual Meeting, pp. 16-23, Cambridge, MA, USA, 1995.

Karttunen, Lauri, Jean-Pierre Chanod, Greg Grefenstette, and Anne Schiller, "Regular Expressions For Language Engineering", Journal of Natural Language Engineering, 2(4):307-330, 1997.

Kay, Martin, "Nonconcatenative Finite-State Morphology", ACL Proceedings, Third European Conference 1987.

Kempe, Andre and Lauri Karttunen, "Parallel Replacement In Finite-State Calculus", Proceedings of the 16th International Conference on Computational Linguistics (CoLing), vol. 2, pp. 622-627, Copenhagen, Denmark, ACL, cmp-lg//9607007, 1996.

Kempe, Andre, Christof Baeijs, Tamas Gaal, Franck Guingne, and Florent Nicart, "WFSC—A New Weighted Finite State Compiler", 8th Int. Conf. on Implementation and Application of Automata (CIAA 03), Santa Barbara, CA, USA Jul. 16-18, 2003.

Kempe, Andre, "NLP Applications Based On Weighted Multi Tape Automata", TALN, Fes, Morocco, Apr. 19-22, 2004.

Kiraz, George Anton and Edmund Grimley-Evans, "Multi-Tape Automata For Speech And Language Systems: A Prolog Implementation", D. Woods and S. Yu, editors, Automata Implementation, No. 1436 in Lecture Notes in Computer Science, Springer Verlag, Berlin, Germany, 1998.

Kiraz, George Anton, "Linearization Of Nonlinear Lexical Representations", ACL Special Interest Group in Computational Phonology, 1997.

Koskenniemi, Kimmo, Pasi Tapanainen, and Atro Voutilainen, "Compiling and using finite-state syntactic rules", Proceedings of COLING'92, vol. 1, pp. 156-162, Nantes, France, 1992.

Kuich, Werner and Arto Salomaa, "Semirings, Automata, Languages", No. 5 in EATCS Monographs on Theoretical Computer Science, Springer Verlag, Berlin, Germany, 1986: Chapter 1 "Linear Algebra", pp. 5-103.

Mohri, Mehryar, "Finite-State Transducers In Language And Speech Processing", Computational Linguistics, 23(2):269-312, 1997.

Mohri, Mehryar, "Generic epsilon-removal and input epsilon-normalization algorithms for weighted transducers", International Journal of Foundations of Computer Science, 13(1):129-143, 2002.

Mohri, Mehryar, Fernando C. N. Pereira, and Michael Riley, "A Rational Design For A Weighted Finite-State Transducer Library", Lecture Notes in Computer Science, 1436:144-158, 1998.

Mohri, Mehryar, Fernando C. N. Pereira, and Michael Riley, "Weighted Automata in Text and Speech Processing", Proceedings of the 12th biennial European Conference on Artificial Intelligence (ECAI-96), Workshop on Extended finite state models of language, Budapest, Hungary, 1996.

Pereira, Fernando C. N. and Michael D. Riley, "Speech Recognition By Composition Of Weighted Finite Automata", Emmanuel Roche and Yves Schabes, editors, Finite-State Language Processing. MIT Press, Cambridge, MA, USA, pp. 431-453, 1997.

Schulz, Klaus U. and Stoyan Mihov, "Fast String Correction With Levenshtein Automata", International Journal on Document Analysis and Recognition (IJDAR), 5(1):67-85, 2002.

Stethem, Scott, Review of "Morphology and Computation" by Richard Sproat, the MIT Press 1992, in Computational Linguistics, v.18 n.4, pp. 552-554, Dec. 1992.

* cited by examiner

```
CROSSPA($A_1^{(n)}, A_2^{(m)}$) → $A$ :
1    $A ← \langle \Sigma_1 \cup \Sigma_2, \emptyset, \bot, \emptyset, \emptyset, \mathcal{K}_1 \rangle$
2    $Stack ← \emptyset$
3    $i ←$ CREATESTATE($i_1, i_2$)
4    $push(Stack, i)$
5    while $Stack \neq \emptyset$ do
6        $q ← pop(Stack) : \mu[q] = (q_1, q_2)$
7        if  $q_1 \neq \bot \wedge q_2 \neq \bot$
8            then for $\forall e_1 \in E(q_1)$ do
9                for $\forall e_2 \in E(q_2)$ do
10                   if  $\neg\exists q' \in Q : \mu[q'] = (n(e_1), n(e_2))$
11                       then $q' ←$ CREATESTATE($n(e_1), n(e_2)$)
12                           $push(Stack, q')$
13                   $E ← E \cup \{ \langle q, \ell(e_1):\ell(e_2), w(e_1) \otimes w(e_2), q' \rangle \}$
14       if  $\varrho(q_1) \neq \bar{0} \vee q_1 = \bot$
15           then for $\forall e_2 \in E(q_2)$ do
16               if  $\neg\exists q' \in Q : \mu[q'] = (\bot, n(e_2))$
17                   then $q' ←$ CREATESTATE($\bot, n(e_2)$)
18                       $push(Stack, q')$
19               $E ← E \cup \{ \langle q, \varepsilon^{(n)}:\ell(e_2), \varrho(q_1) \otimes w(e_2), q' \rangle \}$
20       if  $\varrho(q_2) \neq \bar{0} \vee q_2 = \bot$
21           then for $\forall e_1 \in E(q_1)$ do
22               if  $\neg\exists q' \in Q : \mu[q'] = (n(e_1), \bot)$
23                   then $q' ←$ CREATESTATE($n(e_1), \bot$)
24                       $push(Stack, q')$
25               $E ← E \cup \{ \langle q, \ell(e_1):\varepsilon^{(m)}, w(e_1) \otimes \varrho(q_2), q' \rangle \}$
26   return $A$ CREATESTATE($q_1, q_2$) :
27   $Q ← Q \cup \{q\}$
28   $\varrho(q) ← \varrho(q_1) \otimes \varrho(q_2)$
29   $\mu[q] ← (q_1, q_2)$
30   return $q$
```

FIG. 5

```
AUTOINTERSECT(A₁, j, k) → A :
1    A ← ⟨Σ₁, ∅, ⊥, ∅, ∅, 𝒦₁⟩
2    Stack ← ∅
3    i ← CREATESTATE(i₁, ⊥, ε, ε)
4    push(Stack, i)
5    while q ← pop(Stack) : ν[q] = q₁, ξ[q] = (s, u)  do
6        for ∀e₁ ∈ E(q₁) do
7            (s', u') ← CREATELEFTOVERSTRINGS(s, ℓⱼ(e₁), u, ℓₖ(e₁))
8            if   s' = ε ∨ u' = ε
9                then if  ∃q̂ ∈ Q : ν[q̂] = n(e₁) ∧  ISREACHABLE(q̂, q)  ∧ ξ[q̂] ≠ (s', u')
10                       then return ⊥                              [cannot terminate]
11                    if  ¬∃q' ∈ Q : ν[q'] = n(e₁) ∧ ξ[q'] = (s', u')
12                       then  q' ← CREATESTATE(n(e₁), q, s', u')
13                            push(Stack, q')
14                    E ← E ∪ { ⟨q, ℓ(e₁), w(e₁), q'⟩ }
15   return A CREATELEFTOVERSTRINGS(s₀, s₁, u₀, u₁) → (s, u) :
16   s ← s₀ s₁
17   u ← u₀ u₁
18   x ← lcp(s, u)
19   return (x⁻¹ s, x⁻¹ u)

CREATESTATE(q₁, q̈, s, u) → q :
20   Q ← Q ∪ {q}
21   if  s = ε ∧ u = ε
22       then  ϱ(q) ← ϱ(q₁)
23       else  ϱ(q) ← 0̄
24   ν[q] ← q₁
25   ψ[q] ← q̈
26   ξ[q] ← (s, u)
27   return q ISREACHABLE(q̂, q̈) → boolean :
28   while q̈ ≠ ⊥
29       if  q̈ = q̂
30           then return true
31           else  q̈ ← ψ[q̈]
32   return false
```

*FIG. 6*

```
AUTOINTERSECT(A₁, j, k) → (A, boolean) :
1    (δ_max, δ_max2) ← GETMAXDELAYS(A₁, j, k)
2    A ← ⟨Σ₁, ∅, ⊥, ∅, ∅, 𝒦₁⟩
3    Stack ← ∅
4    i ← GETSTATE(i₁, (ε, ε))
5    while q ← pop(Stack) : ν[q] = q₁, ξ[q] = (s, u) do
6        for ∀e₁ ∈ E(q₁) do
7            (s', u') ← CREATELEFTOVERSTRINGS(s, ℓⱼ(e₁), u, ℓₖ(e₁))
8            if ( s' = ε ∨ u' = ε ) ∧ ( |δ(s', u')| ≤ δ_max2 )
9                then q' ← GETSTATE(n(e₁), (s', u'))
10                   E ← E ∪ { ⟨q, ℓ(e₁), w(e₁), q'⟩ }
11   regular ← ( ∄q∈Q : |δ(ξ[q])| > δ_max ∧ coreachable(q) )
12   return ( A, regular )

CREATELEFTOVERSTRINGS(s₀, s₁, u₀, u₁) → (s, u) :
13   s ← s₀ s₁
14   u ← u₀ u₁
15   x ← lcp(s, u)
16   return (x⁻¹ s, x⁻¹ u)

GETSTATE(q₁, (s', u')) → q :
17   if ∃q' ∈ Q : ν[q'] = q₁ ∧ ξ[q'] = (s', u')
18       then q ← q'
19       else Q ← Q ∪ {q}                    [create new state]
20            if s = ε ∧ u = ε
21                then ϱ(q) ← ϱ(q₁)
22                else ϱ(q) ← 0̄
23            ν[q] ← q₁
24            ξ[q] ← (s', u')
25            push(Stack, q)
26   return q GETMAXDELAYS(A₁, j, k) → (δ_max, δ_max2) :
27   for ∀q₁ ∈ Q₁ do
28       χ[q₁] ← ⊥
29   (δ̂_max, δ̂_min, δ̂_cyc) ← MAXDEL(i₁, j, k, (0,0), (0,0,0))
30   δ_cyc ← δ̂_cyc · max(1, δ̂_cyc − 1)
31   δ_max ← max(δ̂_max − δ̂_min, δ_cyc)
32   return (δ_max, δ_max + δ_cyc)

MAXDEL(q₁, j, k, (χ'₁, χ'₂), (δ'_max, δ'_min, δ'_cyc)) → (δ̂_max, δ̂_min, δ̂_cyc) :
33   δ̂_max ← max(δ'_max, χ'₁ − χ'₂)
34   δ̂_min ← min(δ'_min, χ'₁ − χ'₂)
35   if χ[q₁] = (χ₁, χ₂) ≠ ⊥                  [cycle end]
36       then δ̂_cyc ← max(δ'_cyc, | (χ'₁ − χ'₂) − (χ₁ − χ₂) |)
37       else χ[q₁] ← (χ'₁, χ'₂)
38            δ̂_cyc ← δ'_cyc
39            for ∀e ∈ E(q₁) do
40                (δ̂_max, δ̂_min, δ̂_cyc) ← MAXDEL(n(e), j, k, (χ'₁+|ℓⱼ(e)|, χ'₂+|ℓₖ(e)|), (δ̂_max, δ̂_min, δ̂_cyc))
41            χ[q₁] ← ⊥
42   return (δ̂_max, δ̂_min, δ̂_cyc)
```

*FIG. 9*

INTERSECTCROSS$(A_1, A_2, j, k) \rightarrow A$ :
1  $A \leftarrow \langle \emptyset, \emptyset, \bot, \emptyset, \emptyset, \mathcal{K}_1 \rangle$
2  $Stack \leftarrow \emptyset$
3  $i \leftarrow$ GETSTATE$(i_1, i_2)$
4  while $Stack \neq \emptyset$ do
5  $\quad q \leftarrow pop(Stack) : \mu[q] = (q_1, q_2)$
6  $\quad$ for $\forall e_1 \in E(q_1)$ do
7  $\quad\quad$ for $\forall e_2 \in E(q_2)$ do
8  $\quad\quad\quad$ if $\ell_j(e_1) = \ell_k(e_2)$
9  $\quad\quad\quad\quad$ then $q' \leftarrow$ GETSTATE$(n(e_1), n(e_2))$
10 $\quad\quad\quad\quad\quad E \leftarrow E \cup \{ \langle q, \ell(e_1):\ell(e_2), w(e_1) \otimes w(e_2), q' \rangle \}$
11 return $A$ GETSTATE$(q_1, q_2) \rightarrow q$ :
12 if $\exists q' \in Q : \mu[q'] = (q_1, q_2)$
13 $\quad$ then $q \leftarrow q'$
14 $\quad$ else $Q \leftarrow Q \cup \{q\}$                           [create new state]
15 $\quad\quad\quad \varrho(q) \leftarrow \varrho(q_1) \otimes \varrho(q_2)$
16 $\quad\quad\quad \mu[q] \leftarrow (q_1, q_2)$
17 $\quad\quad\quad push(Stack, q)$
18 return $q$

*FIG. 13*

INTERSECTCROSSEPS($A_1^{(n_1)}, A_2^{(n_2)}, j, k$) → $A$ :
1  $A \leftarrow \{\Sigma_1 \cup \Sigma_2, \emptyset, \bot, \emptyset, \emptyset, K_1\}$
2  $Stack \leftarrow \emptyset$
3  $i \leftarrow$ GETSTATE($i_1, i_2, 0$)
4  while $Stack \neq \emptyset$ do
5    $q \leftarrow pop(Stack) : \vartheta[q] = (q_1, q_2, q_\varepsilon)$
6    for $\forall e_1 \in E(q_1)$ do
7      for $\forall e_2 \in E(q_2)$ do
8        if $\ell_j(e_1) = \ell_k(e_2) \wedge (q_\varepsilon = 0 \vee \ell_j(e_1) \neq \varepsilon)$
9        then $q' \leftarrow$ GETSTATE($n(e_1), n(e_2), 0$)
10         $E \leftarrow E \cup \{\langle q, \ell(e_1) : \ell(e_2), w(e_1) \otimes w(e_2), q' \rangle\}$
11   for $\forall e_1 \in E(q_1)$ do
12     if $\ell_j(e_1) = \varepsilon \wedge q_\varepsilon \in \{0, 1\}$
13     then $q' \leftarrow$ GETSTATE($n(e_1), q_2, 1$)
14       $E \leftarrow E \cup \{\langle q, \ell(e_1) : \varepsilon^{(n_2)}, w(e_1), q' \rangle\}$
15   for $\forall e_2 \in E(q_2)$ do
16     if $\ell_k(e_2) = \varepsilon \wedge q_\varepsilon \in \{0, 2\}$
17     then $q' \leftarrow$ GETSTATE($q_1, n(e_2), 2$)
18       $E \leftarrow E \cup \{\langle q, \varepsilon^{(n_1)} : \ell(e_2), w(e_2), q' \rangle\}$
19 return $A$ GETSTATE($q_1, q_2, q_\varepsilon$) → $q$ :
20 if $\exists q' \in Q : \vartheta[q'] = (q_1, q_2, q_\varepsilon)$
21 then $q \leftarrow q'$
22 else $Q \leftarrow Q \cup \{q\}$     [create new state]
23     $\varrho(q) \leftarrow \varrho(q_1) \otimes \varrho(q_2)$
24     $\vartheta[q] \leftarrow (q_1, q_2, q_\varepsilon)$
25     $push(Stack, q)$
26 return $q$

FIG. 15

METHOD AND APPARATUS FOR PROCESSING NATURAL LANGUAGE USING TAPE-INTERSECTION

CROSS-REFERENCE TO RELATED APPLICATIONS

Priority is claimed from U.S. Provisional Application No. 60/481,639, filed Nov. 14, 2003, entitled "Method And Apparatus For Processing Natural Language Using Multi-Tape Automata", by the same inventors and assignee, which is hereby incorporated herein by reference. In addition, cross-reference is made to the following U.S. Patent Application that is concurrently filed with this patent application, assigned to the same assignee as this patent application, incorporated in this patent application by reference, and claims priority to U.S. Provisional Patent Application Ser. No. 60/481,639, filed Nov. 14, 2003: U.S. patent application Ser. No. 10/849,918, entitled "Method And Apparatus For Processing Natural Using Auto-Intersection".

BACKGROUND AND SUMMARY

The present invention relates to a method an apparatus for processing natural language using operations performed on weighted and non-weighted multi-tape automata.

Finite state automata (FSAs) are mathematically well defined and offer many practical advantages. They allow for fast processing of input data and are easily modifiable and combinable by well defined operations. Consequently, FSAs are widely used in Natural Language Processing (NLP) as well as many other fields. A general discussion of FSAs is described in Patent Application Publication US 2003/0004705 A1 and in "Finite State Morphology" by Beesley and Karttunen (CSLI Publications, 2003), which are incorporated herein by reference.

Weighted finite state automata (WFSAs) combine the advantages of ordinary FSAs with the advantages of statistical models, such as Hidden Markov Models (HMMs), and hence have a potentially wider scope of application than FSAs. Weighted multi-tape automata (WMTAs) have yet more advantages. For example, WMTAs permit the separation of different types of information used in NLP (e.g., surface word form, lemma, POS-tag, domain-specific information) over different tapes, and preserve intermediate results of different steps of NLP on different tapes. Operations on WMTAs may be specified to operate on one, several, or all tapes.

While some basic WMTAs operations, such as union, concatenation, projection, and complementary projection, have been defined for a sub-class of non-weighted multi-tape automata (see for example the publication by Kaplan and Kay, "Regular models of phonological rule systems", in Computational Linguistics, 20(3):331-378, 1994) and implemented (see for example the publication by Kiraz and Grimley-Evans, "Multi-tape automata for speech and language systems: A prolog implementation", in D. Woods and S. Yu, editors, Automata Implementation, number 1436 in Lecture Notes in Computer Science, Springer Verlag, Berlin, Germany, 1998), there continues to be a need for improved, simplified, and more efficient operations for processing WMTAs to make use of these advantages in natural language processing.

In accordance with the invention, there is provided a method and apparatus for using weighted multi-tape automata (WMTAs) in natural language processing (NLP) that includes morphological analysis, part-of-speech (POS) tagging, disambiguation, and entity extraction. In performing NLP, operations are employed that perform cross-product, auto-intersection, and tape-intersection (i.e., single-tape intersection and multi-tape intersection) of automata. Such operations may be performed using transition-wise processing on weighted or non-weighted multi-tape automata.

In accordance with one aspect of the invention (referred to herein as the "tape-intersection" operation, or single-ape intersection for one tape or multi-tape intersection for a plurality of tapes), there is provided in a system for processing natural language, a method for intersecting tapes of a first multi-tape automaton (MTA) and a second MTA, with each MTA having a plurality of tapes and a plurality of paths. The method includes composing the first MTA and the second MTA by intersecting a first tape of the first MTA with a first tape of the second MTA to produce an output MTA. The first tape of the first MTA and the first tape of the second MTA corresponds to a first intersected tape and a second intersected tape of the output MTA, respectively. At least one of the first and the second intersected tapes from the output MTA is removed while preserving all its other tapes without modification.

In accordance with another aspect of the invention, there is provided in a system for processing natural language, a method for intersecting tapes of a first multi-tape automaton (MTA) and a second MTA, with each MTA having a plurality of tapes and a plurality of paths. The method includes: (a) computing a cross-product MTA using the first MTA and the second MTA; (b) generating string tuples for paths of the cross-product MTA; (c) for each string tuple generated at (b), evaluating whether the string of a first tape equals the string of a second tape; (d) for each string tuple evaluated at (c) having equal strings at the first and second tapes, retaining the corresponding string tuple in the cross-product MTA; (e) for each string tuple evaluated at (c) having unequal strings at the first and second tapes, restructuring the cross-product MTA to remove the corresponding string tuple; (f) removing redundant strings in the string tuples retained in the cross-product MTA at (d) to produce an output MTA.

In accordance with yet another aspect of the invention, there is provided in a system for processing natural language, a method for intersecting a first tape of a first multi-tape automaton (MTA) and a second tape of a second MTA, with each MTA having a plurality of tapes and a plurality of paths. The method includes: defining a simulated filter automaton (SFA) that controls how epsilon-transitions are composed along pairs of paths in the first MTA and the second MTA; building an output MTA by: (a) creating an initial state from the initial states of the first MTA, the second MTA, and the SFA; (b) intersecting a selected outgoing transition of the first MTA with a selected outgoing transition of the second MTA, where each outgoing transition having a source state, a target state, and a label; (c) if the label of the first tape of the selected outgoing transition of the first MTA equals the label of the second tape of the selected outgoing transition of the second MTA, creating (i) a transition in the output MTA whose label results from pairing the labels of the selected outgoing transitions, and (ii) a target state corresponding to the target states of the selected outgoing transitions and the initial state of the SFA; (d) if an epsilon transition is encountered on the first tape, creating a transition in the output MTA with a target state that is a function of (i) the target state of the outgoing transition of the first MTA, (ii) the source state of the outgoing transition of the second MTA, and (iii) a first non-initial state of the SFA; (e) if an epsilon transition is encountered on the second tape, creating a transition in the output MTA with a target state that is a function of (i) the source state of the outgoing transition of the first MTA, (ii) the target state of the outgoing transition of the second MTA, and (iii) a second non-initial state of the SFA; and (f repeating (b)-(e) for each outgoing transition of the first MTA and the second MTA.

It will be appreciated that the present invention has the following advantages over weighted 1-tape or 2-tape processing of automata because it allows for: (a) the separation of different types of information used in NLP (e.g., surface form, lemma, POS-tag, domain-specific information, etc.) over different tapes; (b) the preservation of some or all intermediate results of various NLP steps on different tapes; and (c) the possibility of defining and implementing contextual replace rules referring to different types of information on different tapes.

BRIEF DESCRIPTION OF THE DRAWINGS

These and other aspects of the invention will become apparent from the following description read in conjunction with the accompanying drawings wherein the same reference numerals have been applied to like parts and in which:

FIG. 5 sets forth a method in pseudocode for performing a cross-product operation in an embodiment with path alignment;

FIG. 6 sets forth a first method in pseudocode for performing an auto-intersection operation;

FIG. 9 sets forth a second method in pseudocode for performing an auto-intersection operation;

FIG. 13 sets forth a first method in pseudocode for performing a single-tape intersection operation;

FIG. 15 sets forth a method in pseudocode of a second embodiment for performing the single-tape intersection operation;.

DETAILED DESCRIPTION

Figure 1:
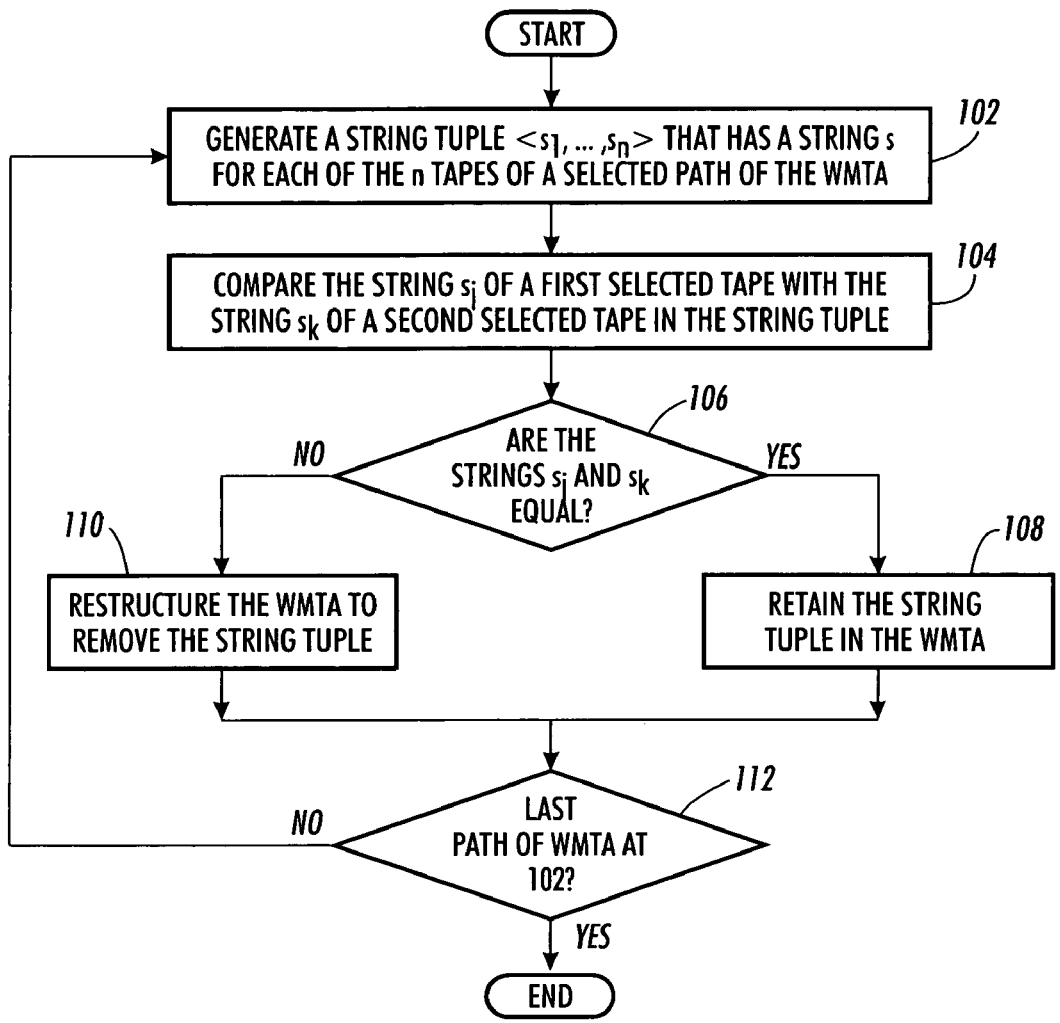
FIG. 1 is a flow diagram that sets forth steps for performing an auto-intersection operation.

Outline of Detailed Description
A. Definitions
  A.1 Semirings
  A.2 Weighted Automata
  A. 3 Weighted Multi-Tape Automata
B. Operations On Multi-Tape Automata
  B.1 Pairing and Concatenation
  B.2 Projection and Complementary Projection
  B. 3 Cross-Product
  B. 4 Auto-intersection
  B.5 Single-Tape Intersection
  B.6 Multi-Tape Intersection
  B. 7 Transition Automata and Transition-Wise Processing
C. Methods For Performing MTA Operations
  C.1 Cross-Product
    C.1.1 Conditions
    C.1.2 Path Concatenation Method
    C.1.3 Path Alignment Method
    C.1.4 Complexity
  C.2 Auto-Intersection
    C.2.1 Conditions Of First Method
    C.2.2 First Method
    C.2.3 Example Of First Method
    C.2.4 Conditions Of Second Method
    C.2.5 Second Method
      C.2.5. A Compile Limits
      C.2.5. B Construct Auto-Intersection
      C.2.5. C Test Regularity
    C.2.6 Examples Of Second Method
  C.3 Single-Tape Intersection
    C.3.1 Conditions
    C.3.2 First Embodiment
    C.3.3 Mohri's Epsilon-Filter
    C.3.4 Second Embodiment
    C.3.5 Complexity
  C.4 Multi-Tape Intersection
    C.4.1 Conditions
    C.4.2 Embodiments
    C.4.3 Example
D. Applications
  D..1 General Use
  D.2 Building A Lexicon From A Corpus
  D.3 Enhancing A Lexicon With Lemmas
  D.4 Normalizing A Lexicon
  D.5 Using A Lexicon
  D.6 Searching For Similarities
  D.7 Preserving Intermediate Transduction Results
  D.8 Example System
E. Miscellaneous
A. Definitions This section recites basic definitions of algebraic structures that are used in describing the present invention, such as for "monoid" and "semiring" and "weighted automaton" (which are described in more detail in the following publications, which are incorporated herein by reference, by: Eilenberg, "Automata, Languages, and Machines", volume A, Academic Press, San Diego, Calif., USA, 1974; and Kuich and Salomaa, "Semirings, Automata, Languages", Number 5 in EATCS Monographs on Theoretical Computer Science, Springer Verlag, Berlin, Germany, 1986), and for weighted multitape automaton, based on the definitions of multi-tape automaton (which are described in more detail in the following publication, which is incorporated herein by reference, by: Elgot and Mezei, "On relations defined by generalized finite automata", IBM Journal of Research and Development, 9:47-68, 1965).

A.1 Semirings

A monoid consists of a set M, an associative binary operation "o" on M, and a neutral element $\bar{1}$ such that $\bar{1}oa=ao\bar{1}=a$ for all $a \in M$. A monoid is called commutative iff aob=boa for all a, b∈M.

The set K with two binary operations $\oplus$ (collection) and $\otimes$ (extension) and two elements $\bar{0}$ and $\bar{1}$ is called a semiring, if it satisfies the following properties:

(a) $<K, \oplus, \bar{0}>$ is a commutative monoid;
(b) $<K, \otimes, \bar{1}>$ is a monoid;
(c) $\otimes$ is left-distributive and right-distributive over $\oplus$:

$$a \otimes (b \oplus c) = (a \otimes b) \oplus (a \otimes c), (a \oplus b) \otimes c = (a \otimes c) \oplus (b \otimes c),$$
$$\forall a, b, c \in K;$$

(d) $\bar{0}$ is an annihilator for $\otimes$: $\bar{0} \otimes a = a \otimes \bar{0} = \bar{0}, \forall a \in K$.

A generic semiring $\mathcal{K}$ is denoted as $<K, \oplus, \otimes, \bar{0}, \bar{1}>$.

Some methods for processing automata require semirings to have specific properties. Composition, for example, requires a semiring to be commutative (which is described in more detail in the following publications, incorporated herein by reference, by: Pereira and Riley, "Speech recognition by composition of weighted finite automata", in Emmanuel Roche and Yves Schabes, editors, Finite-State Language Processing, MIT Press, Cambridge, Mass., USA, pages 431-453, 1997; and Mohri, Pereira, and Riley, "A rational design for a weighted finite-state transducer library", Lecture Notes in Computer Science, 1436:144-158, 1998), and $\epsilon$ (i.e., epsilon) removal requires it to be k-closed (which is described in more detail in the following publication incorporated herein by reference by: Mohri, "Generic epsilon-removal and input epsilon-normalization algorithms for weighted transducers", International Journal of Foundations of Computer Science, 13(1):129-143, 2002). These properties are defined as follows:

(a) commutativity: $a \otimes b = b \otimes a, \forall a, b \in K$; and (b) k-closedness: $\bigoplus_{n=0}^{k+1} a^n = \bigoplus_{n=0}^{k} a^n, \forall a \in K.$ The following well-known examples are all commutative semirings:

(a) $<\mathbb{B}, +, \times, 0, 1>$: boolean semiring, with $\mathbb{B}=\{0, 1\}$ and $1+1=1$;
(b) $<\mathbb{N}, +, \times, 0, 1>$: integer semiring with the usual addition and multiplication;
(c) $<\mathbb{R}^+, +, \times, 0, 1>$: real positive sum times semiring;
(d) $<\overline{\mathbb{R}}^+, \min, +, \infty, 0>$: a real tropical semiring where $\overline{\mathbb{R}}^+$ denotes $\mathbb{R}^+ \cup \{\infty\}$.

A number of methods for processing automata require semirings to be equipped with an order or partial order denoted by $<_\mathcal{K}$. Each idempotent semiring $\mathcal{K}$ (i.e., $\forall a \in \mathcal{K}$: $a \oplus a = a$) has a natural partial order defined by $a <_\mathcal{K} b \Leftrightarrow a \oplus b = a$. In the above examples, the boolean and the real tropical semiring are idempotent, and hence have a natural partial order.

A.2 Weighted Automata

A weighted automaton A over a semiring $\mathcal{K}$ is defined as a six-tuple:

$$A =_{def} \langle \Sigma, Q, I, F, E, \mathcal{K} \rangle$$

with:

| | | |
|---|---|---|
| $\Sigma$ | | being a finite alphabet |
| Q | | the finite set of states |
| I | $\subseteq Q$ | the set of initial states |
| F | $\subseteq Q$ | the set of final states |
| E | $\subseteq Q \times (\Sigma \cup \{\epsilon\}) \times Q$ | the finite set of transitions and |
| $\mathcal{K}$ | $= \langle \bar{0}, \bar{1}, \oplus, \otimes \rangle$ | the semiring |

For any state $q \in Q$, there is defined:

| | | |
|---|---|---|
| $\lambda(q)$ | $\lambda: I \to \mathcal{K}$ | the initial weight function (with $\lambda(q) = \bar{0}, \forall q \notin I$) |
| $\varrho(q)$ | $\varrho: F \to \mathcal{K}$ | the final weight function (with $\varrho(q) = \bar{0}, \forall q \notin F$) |
| E(q) | $= \{e | p(e) = q\}$ | the finite set of out-going transitions | and for any transition $e \in E$, $e=<p, l, w, n>$, there is defined:

| | | |
|---|---|---|
| p(e) | $p: E \to Q$ | the source state |
| l(e) | $l: E \to \Sigma \cup \{\epsilon\}$ | the label (with $\epsilon$ being the empty string) |
| w(e) | $w: E \to \mathcal{K}$ | the weight (with $\omega(e) \neq \bar{0}, \forall e \in E$) |
| n(e) | $n: E \to Q$ | the target state |

A path $\pi$ of length $r=|\pi|$ is a sequence of transitions $e_1 e_2 \ldots e_r$ such that $n(e_i)=p(e_i+1)$ for all $i \in [[1, r-1]]$. A path is said to be successful iff $p(e_1) \in I$ and $n(e_r) \in F$. In the following description only successful paths are considered. The label, $l(\pi)$, of any successful path $\pi$ equals the concatenation of the labels of its transitions:

$$l(\pi)=l(e_1)l(e_2)\ldots l(e_r)$$

and its "weight" or "accepting weight" $w(\pi)$ is:

$$\omega(\pi) = \lambda(p(e_1)) \otimes \left( \bigotimes_{j=[[1, l]]} \omega(e_j) \right) \otimes \varrho(n(e_r))$$

$\Pi(s)$ denotes the (possibly infinite) set of successful paths of A and $\Pi(s)$ denotes the (possibly infinite) set of successful paths for the string s:

$$\Pi(s)=\{\pi | \forall \pi \in \Pi(A), s=l(\pi)\}$$

$\mathcal{L}(A)$ is defined as the language of A. It is the (possibly infinite) set of strings s having successful paths in A:

$$\mathcal{L}(A)=\{l(\pi) | \pi \in \Pi(A)\})$$

The accepting weight for any string $s \in \mathcal{L}(A)$ is defined by:

$$\omega(s) = \bigoplus_{\pi \in \Pi(s)} \omega(\pi)$$

A.3 Weighted Multi-Tape Automata

In analogy to a weighted automaton, a weighted multi-tape automaton (WMTA), also called weighted n-tape automaton, over a semiring $\mathcal{K}$ is defined as a six-tuple:

$$A^{(n)} =_{def} \langle \Sigma, Q, I, F, E^{(n)}, \mathcal{K} \rangle$$

with $\Sigma$, Q, I, F, and $\mathcal{K}$ being defined as above in section A.2, and with:

| | | |
|---|---|---|
| $E^{(n)}$ | $\subseteq Q \times (\Sigma \cup \{\epsilon\})^n \times Q$ | being the finite set of n-tape transitions |
| n | | and the arity, i.e., the number of tapes in A |

Most of the definitions given for weighted automata are also valid for WMTAs, except that each transition $e^{(n)} \in E^{(n)}$ is labeled with:

$$l(e^{(n)}): E^{(n)} \to (\Sigma \cup \{\epsilon\})^n \text{ an n-tuple of symbols}$$

If all symbols $\sigma \in (\Sigma \cup \{\epsilon\})$ of a tuple are equal, the shorthand notation $\sigma^{(n)}$ may be used on the terminal symbol. For example:

$$a^{(3)} = \langle a, a, a \rangle$$

$$\epsilon^{(2)} = \langle \epsilon, \epsilon \rangle$$

The label of a successful path $\pi^{(n)}$ of length $r = |\pi^{(n)}|$ equals the concatenation of the labels of its transitions, all of which must have the same arity n:

$$l(\pi^{(n)}) = l(e_1^{(n)}) \, l(e_2^{(n)}) \ldots l(e_r^{(n)})$$

which is an n-tuple of strings:

$$l(\pi^{(n)}) = s^{(n)} = \langle s_1, s_2, \ldots, s_n \rangle$$

where each string $s_j$ is a concatenation of the j-th element of all $l(e_i^{(n)})$ of $\pi^{(n)}$ (with $i \in [[1,r]]$). In anticipation of the projection operation, $\mathcal{P}_j()$, (defined in section B.2) this can be expressed as:

$$s_j = \mathcal{P}_j(l(\pi^{(n)})) = \mathcal{P}_j(l(e_1^{(n)})) \, \mathcal{P}_j(l(e_2^{(n)})) \ldots \mathcal{P}_j(l(e_r^{(n)}))$$

The symbols on $e^{(n)}$ are not "bound" to each other. For example, the string triple $s^{(3)} = \langle aaa, bb, ccc \rangle$ can be encoded, among others, by any of the following sequences of transitions: (a:b:c)(a:b:c)(a:$\epsilon$:c) or (a:b:c)(a:$\epsilon$:c)(a:b:c) or ($\epsilon$:$\epsilon$:c)(a:b:c)(a:b:c)(a:$\epsilon$:$\epsilon$), etc.

$\Pi(s)$ denotes the (possibly infinite) set of successful paths for the n-tuple of strings $s^{(n)}$:

$$\Pi(s^{(n)}) = \{\pi^{(n)} | \forall \pi^{(n)} \in \Pi(A^{(n)}), s^{(n)} = l(\pi^{(n)})\}$$

$\mathcal{L}(A^{(n)})$ is called the n-tape language of $A^{(n)}$ (which may also be referred to as a relation of arity(n)). It is the (possibly infinite) set of n-tuples of strings $s^{(n)}$ having successful paths in $A^{(n)}$:

$$\mathcal{L}(A^{(n)}) = \{l^{(n)} | l^{(n)} = l(\pi^{(n)}), \forall \pi^{(n)} \in \Pi(A^{(n)})\}$$

The accepting weight for any n-tuple of strings $s^{(n)} \in \mathcal{L}(A^{(n)})$ is defined by:

$$\omega(s^{(n)}) = \bigoplus_{\pi^{(n)} \in \Pi(s^{(n)})} \omega(\pi^{(n)})$$

It is possible to define an arbitrary weighted relation between the different tapes of $\mathcal{L}(A^{(n)})$. For example, $\mathcal{L}(A^{(2)})$ of the weighted transducer (i.e., two-tape automata) $A^{(2)}$ is usually considered as a weighted relation between its two tapes, $\mathcal{P}_1(\mathcal{L}(A^{(2)}))$ and $\mathcal{P}_2(\mathcal{L}(A^{(2)}))$. One of the two tapes is considered to be the input tape, the other as the output tape.

B. Operations on Multi-Tape Automata

All operations defined in this section are defined on symbol tuples, string tuples, or n-tape languages, taking their accepting weights into account. Whenever these operations are used on transitions, paths, or automata, they are actually applied to their labels or languages respectively. For example, the binary operation ö on two automata, $A_1^{(n)} \ddot{o} A_2^{(n)}$, actually means $\mathcal{L}(A_1^{(n)} \ddot{o} A_2^{(n)}) = \mathcal{L}(A_1^{(n)}) \ddot{o} \mathcal{L}(A_2^{(n)})$, and the unary operation ȯ on one automaton, $\dot{o} A^{(n)}$, actually means $\mathcal{L}(\dot{o} A^{(n)}) = \dot{o} \mathcal{L}(A^{(n)})$.

B.1 Pairing and Concatenation

The pairing of two string tuples, $s^{(n)}:v^{(m)} = u^{(n+m)}$, and its accepting weight is defined as:

$$\langle s_1, \ldots, s_n \rangle : \langle v_1, \ldots, v_m \rangle =_{def} \langle s_1, \ldots, s_n, v_1, \ldots, v_m \rangle$$

$$w(\langle s_1, \ldots, s_n \rangle : \langle v_1, \ldots, v_m \rangle) =_{def} w(\langle s_1, \ldots, s_n \rangle) \otimes w(\langle v_1, \ldots, v_m \rangle)$$

1-tuples of strings are not distinguished herein from strings, and hence, instead of writing $s^{(1)}:v^{(1)}$ or <s>:<v>, s:v is simply written. If strings contain only one symbol $\sigma \in (\Sigma \cup \epsilon)$, they are not distinguished from the strings and their only symbol, and instead the pairing $\sigma_1:\sigma_2$ is written.

Pairing is associative:

$$s_1^{(n1)}:s_2^{(n2)}:s_3^{(n3)} = (s_1^{(n1)}:s_2^{(n2)}):s_3^{(n3)} = s_1^{(n1)}:(s_2^{(n2)}:s_3^{(n3)}) = s^{(n1+n2+n3)}$$

The concatenation of two sting tuples of equal arity, $s^{(n)} v^{(n)} = u^{(n)}$, and its accepting weight are defined as:

$$\langle s_1, \ldots, s_n \rangle \langle v_1, \ldots, v_n \rangle =_{def} \langle s_1 v_1, \ldots, s_n v_n \rangle$$

$$w(\langle s_1, \ldots, s_n \rangle \langle v_1, \ldots, v_n \rangle) =_{def} w(\langle s_1, \ldots, s_n \rangle) \otimes w(\langle v_1, \ldots, v_n \rangle)$$

Again, 1-tuples of strings are not distinguished herein from strings, and hence, instead of writing $s^{(1)} v^{(1)}$ or <s><v>, sv is simply written. If strings contain only one symbol $\sigma \in (\Sigma \cup \epsilon)$, they are not distinguished from the strings and their only symbol, and instead the concatenation $\sigma_1 \sigma_2$ is written.

Concatenation is associative:

$$s_1^{(n)} s_2^{(n)} s_3^{(n)} = (s_1^{(n)} s_2^{(n)}) s_3^{(n)} = s_1^{(n)} (s_2^{(n)} s_3^{(n)}) = s^{(n)}$$

The relation between pairing and concatenation can be expressed through a matrix of string tuples $s_{jk}^{(n_j)}$ given by:

$$\begin{bmatrix} s_{11}^{(n_1)} & \ldots & s_{1r}^{(n_1)} \\ \vdots & & \vdots \\ s_{m1}^{(n_m)} & \ldots & s_{mr}^{(n_m)} \end{bmatrix}$$

that are horizontally concatenated and vertically paired:

$$s^{(n_1 + \ldots + n_m)} = \langle s_{11}^{(n_1)} \ldots s_{1r}^{(n_1)} \rangle : \ldots : \langle s_{m1}^{(n_m)} \ldots s_{mr}^{(n_m)} \rangle$$

$$= \langle s_{11}^{(n_1)} : \ldots : s_{m1}^{(n_m)} \rangle \ldots \langle s_{1r}^{(n_1)} : \ldots : s_{mr}^{(n_m)} \rangle$$

where the equation above does not hold for the accepting weights unless they are defined over a commutative semiring $\mathcal{K}$.

B.2 Projection and Complementary Projection

A projection $\mathcal{P}_{j,k,\ldots}(s^{(n)})$ retains only those strings (i.e., tapes) of the tuple $s^{(n)}$ that are specified by the indices j, k, ... $\in [[1,n]]$, and places them in the specified order. The projection and its accepting weight are defined as:

$$\mathcal{P}_{j,k,\ldots}(\langle s_1, \ldots, s_n \rangle) =_{def} \langle s_j, s_k, \ldots \rangle$$

$$w(\mathcal{P}_{j,k,\ldots}(\langle s_1, \ldots, s_n \rangle)) =_{def} w(\langle s_1, \ldots, s_n \rangle)$$

where the weights are not modified by the projection. Projection indices can occur in any order and more than once. Thus, the tapes of $s^{(n)}$ can, for example, be reversed or duplicated:

$$\mathcal{P}_{n,\ldots,1}(\langle s_1, \ldots, s_n \rangle) = \langle s_n, \ldots, s_1 \rangle$$

$$\mathcal{P}_{j,j,j}(\langle s_1, \ldots, s_n \rangle) = \langle s_j, s_j, s_j \rangle$$

The relation between projection and pairing, and between their respective accepting weights is:

$$s^{(n)} = \mathcal{P}_1(s^{(n)}) : \ldots : \mathcal{P}_n(s^{(n)})$$

$$\omega(s^{(n)}) \neq \omega(\mathcal{P}_1(s^{(n)}) : \ldots : \mathcal{P}_n(s^{(n)})) = \underbrace{\omega(s^{(n)}) \otimes \ldots \otimes \omega(s^{(n)})}_{n \text{ times}}$$

A complementary projection $\overline{\mathcal{P}}_{j,k,\ldots}(s^{(n)})$ removes those strings (i.e., tapes) of the tuple $s^{(n)}$ that are specified by the indices j,k,... $\in [[1,n]]$, and preserves all other strings in their original order. Complementary projection and its accepting weight are defined as:

$$\overline{\mathcal{P}}_{j,k,\ldots}(\langle s_1, \ldots, s_n \rangle) =_{def} \langle \ldots, s_{j-1}, s_{j+1}, \ldots, s_{k-1}, s_{k+1}, \ldots \rangle$$

$$w(\overline{\mathcal{P}}_{j,k,\ldots}(\langle s_1, \ldots, s_n \rangle)) =_{def} w(\langle s_1, \ldots, s_n \rangle)$$

Complimentary projection indices can occur only once, but in any order.

The projection of an n-tape language is the projection of all its string tuples and complimentary projection of an n-tape language is defined in the same way, respectively as:

$$\mathcal{P}_{j,k,\ldots}(\mathcal{L}^{(n)}) = \{\mathcal{P}_{j,k,\ldots}(s^{(n)}) | \forall s^{(n)} \in \mathcal{L}^{(n)}\}$$

$$\overline{\mathcal{P}}_{j,k,\ldots}(\mathcal{L}^{(n)}) = \{\overline{\mathcal{P}} \overline{\mathcal{P}}_{j,k,\ldots}(s^{(n)}) | \forall s^{(n)} \in \mathcal{L}^{(n)}\}$$

B.3 Cross-Product

The cross-product of two n-tape languages is defined as:

$$\mathcal{L}_1^{(n)} \times \mathcal{L}_2^{(m)} =_{def} \{s^{(n)} \cdot v^{(m)} | \forall s^{(n)} \in \mathcal{L}_1^{(n)}, \forall v^{(m)} \in \mathcal{L}_2^{(m)}\}$$

The accepting weight of each string tuple in $\mathcal{L}_1^{(n)} \times \mathcal{L}_2^{(m)}$ follows from the definition of pairing. The cross product operation is associative.

A well known example (and special case) is the cross-product of two acceptors (i.e., a 1-tape automata) leading to a transducer (i.e., a 2-tape automaton):

$$A^{(2)} = A_1^{(1)} \times A_2^{(1)}$$

$$\mathcal{L}(A_1^{(1)} \times A_2^{(1)}) = \{s:v | \forall s \in \mathcal{L}(A_1^{(1)}), \forall v \in \mathcal{L}(A_2^{(1)})\}$$

$$w(s:v) = w_{A_1}(s) \otimes w_{A_2}(v)$$

B.4 Auto-Intersection

Operations for auto-intersection are described in this section. More specifically, this section describes operations for performing auto-intersection on string tuples and languages.

The auto-intersection $I_{j,k}(s^{(n)})$ on string tuples succeeds, if the two strings $s_j$ and $s_k$ of the tuple $s^{(n)} = \langle s_1, \ldots, s_n \rangle$ are equal (with j,k $\in [[1,n]]$), and fails otherwise ($\bot$). Auto-intersection and its accepting weight are defined as:

$$I_{j,k}(s^{(n)}) =_{def} \begin{cases} s^{(n)} & \text{for } s_j = s_k \\ \bot & \text{for } s_j \neq s_k \end{cases}$$

$$\omega(I_{j,k}(s^{(n)})) =_{def} \begin{cases} \omega(s^{(n)}) & \text{for } s_j = s_k \\ \overline{0} & \text{for } s_j \neq s_k \end{cases}$$

This means the weight of a successfully auto-intersected string tuple is not modified, whereas the weight of a string tuple where the auto-intersection failed is $\overline{0}$, which corresponds to the invalidation or elimination of that tuple.

FIG. 1 is a flow diagram that sets forth steps for performing the auto-intersection operation on a first tape and a second tape of a path of a weighted multi-tape automaton. At 102, a string tuple $\langle s_1, \ldots, s_n \rangle$ is generated that has a string s for each of the n tapes of a selected path of the WMTA. At 104, the string $s_j$ of the first tape is compared with the string $s_k$ of the second tape in the string tuple. If at 106, the strings $s_j$ and $s_k$ are equal, then the string tuple is retained in the WMTA at 108; otherwise, the WMTA is restructured to remove the string tuple at 110. At 112, if the last of the paths of the WMTA has been processed, then auto-intersection completes; otherwise, it continues with the next selected path of the WMTA at 102.

Figure 2:
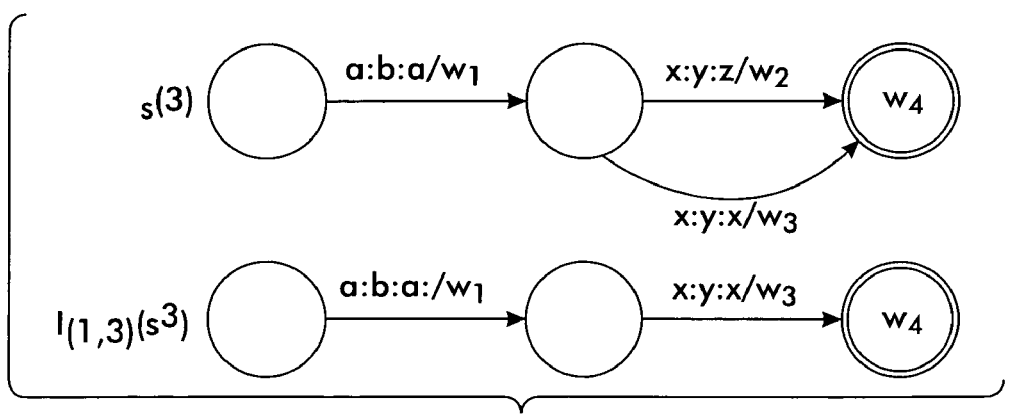
FIG. 2 presents two weighted three-tape automata for illustrating an example of the auto-intersection operation.

For example, the result of performing the auto-intersection operation $I_{j,k}(s^{(n)})$ on tapes 1 and 3 of the example three-tape WMTA (i.e., $s^{(3)}$) shown FIG. 2 fails for the first of its two paths, producing a first string tuple <ax, by, az> (with weight $w_1 w_2$), but succeeds for the second of its two paths, producing a second string tuple <ax, by, ax> (with weight $w_1 w_3$). The final state of the WMTA has weight $w_4$. Because the strings of tape 1 (i.e., "ax") and tape 3 (i.e., "az") of the first string tuple <ax, by, az> are not equal unlike the strings of tape 1 (i.e., "ax") and tape 3 (i.e., "ax") of the second string tuple <ax, by, ax>, the WMTA shown in FIG. 2 is restructured to remove the arc x:y:x/$w_2$ of the first path because there are no other successful paths in the WMTA that depend on that arc (i.e., $I_{(1,3)(s^{(3)})}$). The result of the auto-intersection of the two selected tapes 1 and 3 of the WMTA is to filter out all string tuples of the WMTA except for those that have strings that are equal on two selected tapes.

More generally, auto-intersection of a language, $I_{j,k}(\mathcal{L}^{(n)})$, equals the auto-intersection of all of its string tuples such that only the successfully auto-intersected string tuples are retained, which may be defined as:

$$I_{j,k}(\mathcal{L}^{(n)}) =_{def} \{s^{(n)} | s_j = s_k, s^{(n)} \in \mathcal{L}^{(n)}\}$$

$$I_{j,k}(\mathcal{L}^{(n)}) = \{I_{j,k}(s^{(n)}) | s^{(n)} \in \mathcal{L}^{(n)}\}$$

$$I_{j,k}(\mathcal{L}^{(n)})_1 \subseteq \mathcal{L}^{(n)}$$

For example, given a language $\mathcal{L}_1^{(3)}$ (where "*" denotes kleen star):

$$\mathcal{L}_1^{(3)} = \langle a, x, \epsilon \rangle \langle b, y, a \rangle^* \langle \epsilon, z, b \rangle = \langle ab^*, xy^*z, a^*b \rangle,$$

the results of its auto-intersection $I_{1,3}(\mathcal{L}_1^{(3)})$ of tapes 1 and 3 is:

$$I_{1,3}(\mathcal{L}^{(3)}) = \{\langle ab, xyz, ab \rangle\}$$

which means the auto-intersection admits a single iteration through the cycle <b,y,a>*(i.e., "*" takes only the value 1).

B.5 Single-Tape Intersection

Single-tape intersection of two multi-tape languages, $\mathcal{L}_1^{(n)}$ and $\mathcal{L}_2^{(m)}$, is based on one single tape j and k from each of their sets of n and m tapes, respectively, and may be defined as:

$$\mathcal{L}_1^{(n)} \underset{j,k}{\cap} \mathcal{L}_2^{(m)} =_{def} \overline{\mathcal{P}}_{n+k}(\mathcal{I}_{j,n+k}(\mathcal{L}_1^{(n)} \times \mathcal{L}_2^{(m)})).$$

The single-tape intersection operation pairs each string tuple $s^{(n)} \in \mathcal{L}_1^{(n)}$ with each string tuple $v^{(m)} \in \mathcal{L}_2^{(m)}$ iff $s_j = v_k$. The resulting language $\mathcal{L}^{(n+m-1)}$ is defined as:

$$\mathcal{L}^{(n+m-1)} = \{u^{(n+m-1)} | u^{(n+m-1)} = \overline{\mathcal{P}}_{n+k}(s^{(n)}:v^{(m)}), s^{(n)} \in \mathcal{L}_1^{(n)}, v^{(m)} \in \mathcal{L}_2^{(m)}, s_j = v_k\}$$

with weight w:

$$w(u^{(n+m-1)}) = w(s^{(n)}) \otimes w(v^{(m)}).$$

Single-tape intersection can intuitively be understood as a "composition" of the two languages such that tape j of $\mathcal{L}_1^{(n)}$ is intersected with tape k of $\mathcal{L}_2^{(m)}$. Tape k, which due to the intersection becomes equal to tape j, is then removed, and all other tapes of both languages are preserved without modification. For example, if one language contains the ordered pair <x,y> and another language contains the ordered pair <y,z>, then composing <x,y> and <y,z>, in that order, results in a language that contains the ordered pair <x,z>, whereas intersecting <x,y> and <y,z>, at tapes 2 and 1 respectively, results in the language that contains the ordered pair <x,y,z>.

Single-tape intersection is neither associative nor commutative, except for special cases. A first special case of single-tape intersection is the intersection of two acceptors (i.e., 1-tape automata) leading to an acceptor, which may be defined as:

$$A_1^{(1)} \underset{1,1}{\cap} A_2^{(1)} = A_1^{(1)} \cap A_2^{(1)} = \overline{\mathcal{P}}_2(\mathcal{I}_{1,2}(A_1^{(1)} \times A_2^{(1)}))$$

where the first special case of single-tape intersection has the language $\mathcal{L}$ and weight w:

$$\mathcal{L}(A_1^{(1)} \cap A_2^{(1)}) = \{s | s \in \mathcal{L}(A_1), s \in \mathcal{L}(A_2)\}$$

$$w(s) = w_{A_1}(s) \otimes w_{A_2}(s)$$

and where single-tape intersection has the same language:

$$\mathcal{L}(A_1^{(1)} \times A_2^{(1)}) = \{\langle s_1, s_2 \rangle | s_1 \in \mathcal{L}(A_1), s_2 \in \mathcal{L}(A_2)\}$$

$$\mathcal{L}(\mathcal{I}_{1,2}(A_1^{(1)} \times A_2^{(1)})) = \{\langle s, s \rangle | s \in \mathcal{L}(A_1), s \in \mathcal{L}(A_2)\}$$

$$\mathcal{L}(\overline{\mathcal{P}} \mathcal{P}_2(\mathcal{I}_{1,2}(A_1^{(1)} \times A_2^{(1)}))) = \{s | s \in \mathcal{L}(A_1), s \in \mathcal{L}(A_2)\}$$

$$w(s) = w(\langle s, s \rangle) = w(\langle s_1, s_2 \rangle) = w_{A_1}(s) \otimes w_{A_2}(s)$$

A second special case of single-tape intersection is the composition of two transducers (i.e., 2-tape automata) leading to a transducer. The second special case of single-tape intersection requires an additional complementary projection and may be defined as:

$$A_1^{(2)} \diamond A_2^{(2)} = \overline{\mathcal{P}}_2\left(A_1^{(2)} \underset{2,1}{\cap} A_2^{(2)}\right) = \overline{\mathcal{P}}_{2,3}(\mathcal{I}_{2,3}(A_1^{(2)} \times A_2^{(2)})).$$

Figure 3:
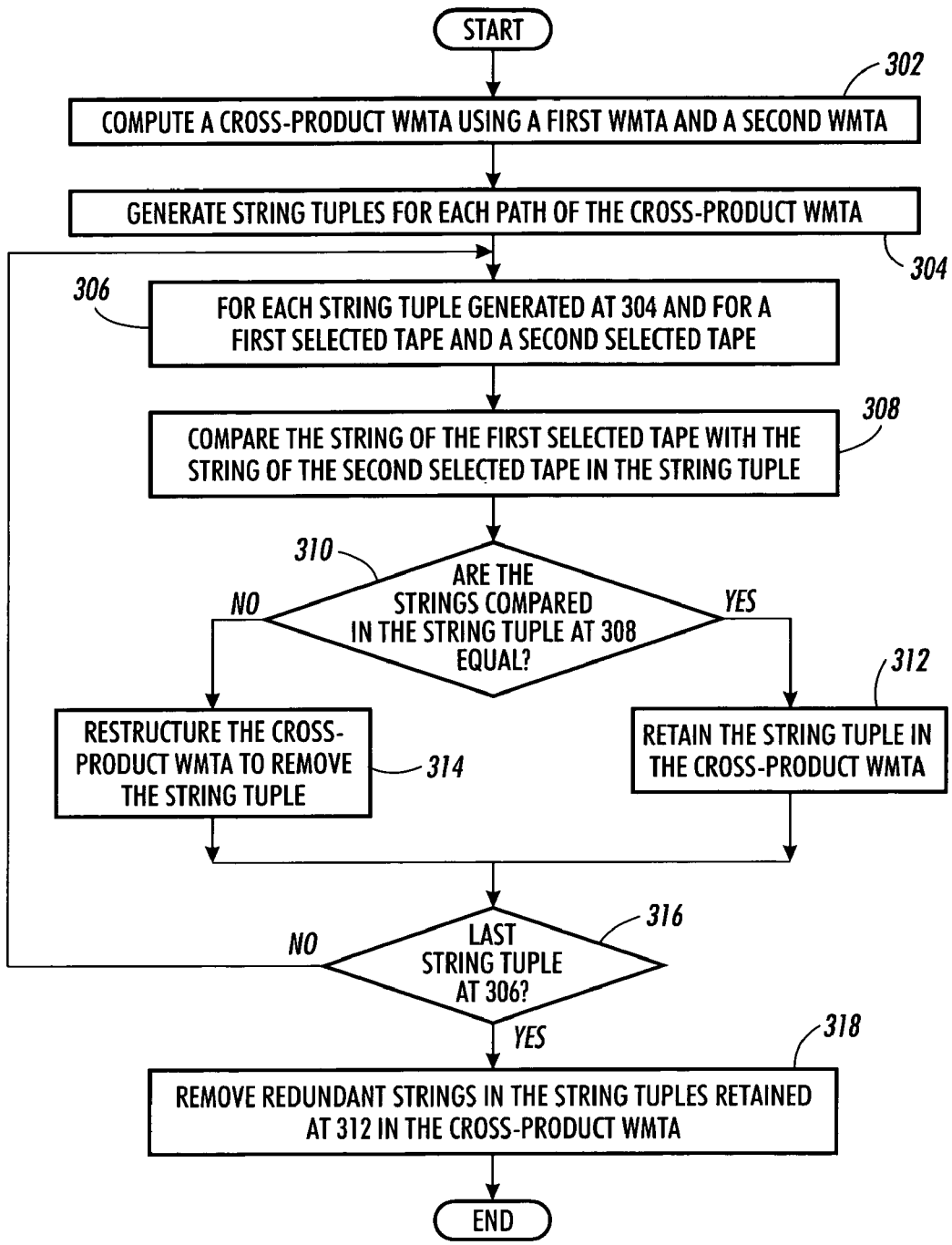
FIG. 3 is a flow diagram that sets forth steps for performing a single-tape intersection operation of a first WMTA and a second WMTA.

FIG. 3 is a flow diagram that sets forth steps for performing a single-tape intersection operation of a first WMTA and a second WMTA. At 302, a cross-product WMTA is computed using the first WMTA and the second WMTA. At 304, a string tuple for each path of the cross-product WMTA is generated. At 306 and 316, for each string tuple generated at 304, the string of a first selected tape is compared with the string of a second selected tape at 308. If at 310, the strings compared at 308 are equal, then the corresponding string tuple is retained in the cross-product WMTA at 312; otherwise, the corresponding string tuple is restructured at 314. When strings of the last tuple have been compared at 316, redundant strings retained in the string tuples at 312 are removed in the cross-product WMTA at 318.

Figure 4:
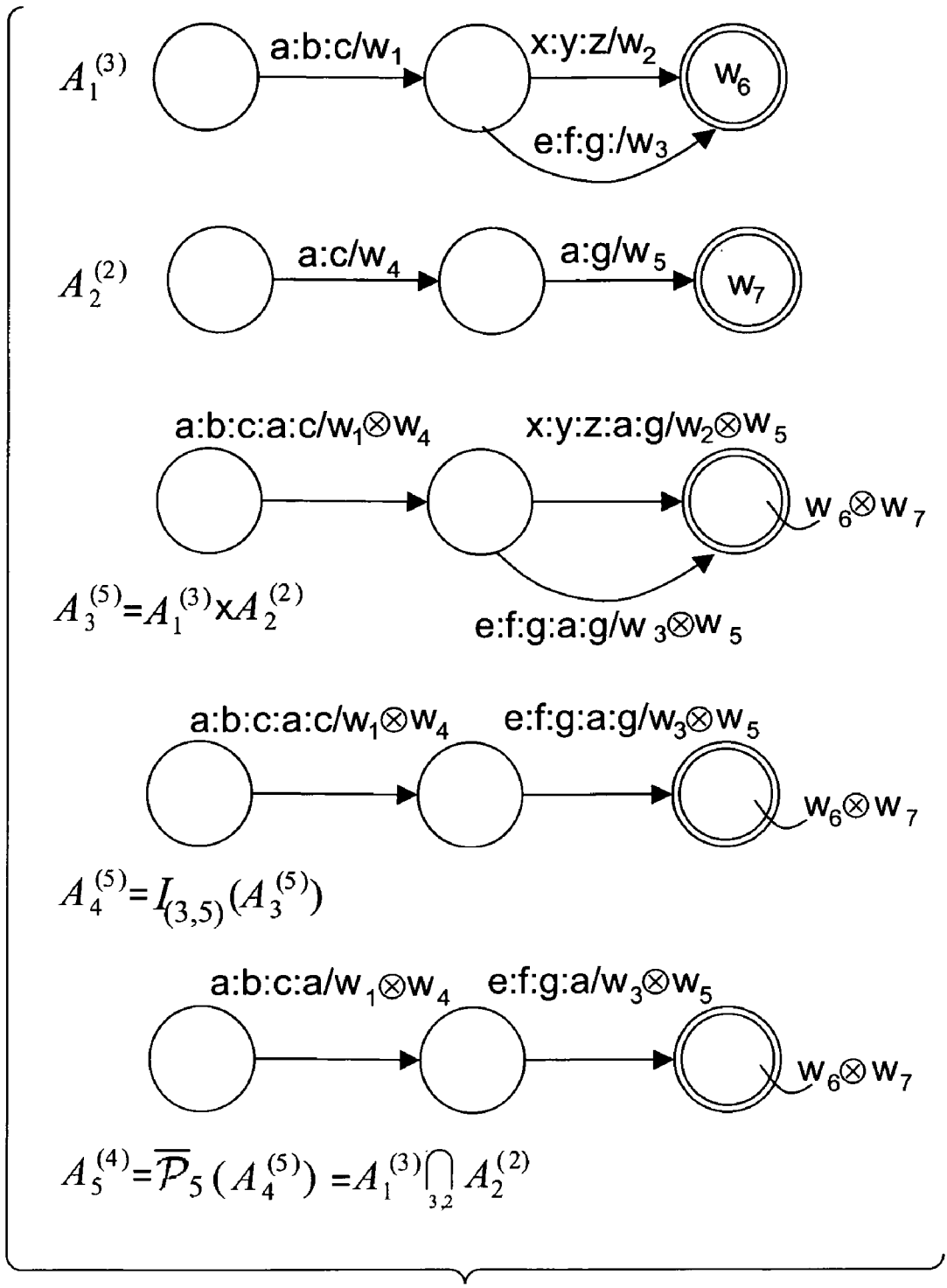
FIG. 4 presents two WMTAs for illustrating a simple example of the single-tape intersection operation.

For example, FIG. 4 presents two WMTAs $A_1^{(3)}$ (with string tuple <ax, by, cz> and weight $w_1 \otimes w_2$ and string tuple <ae, bf, cg> and weight $w_1 \otimes w_3$) and $A_2^{(2)}$ (with string tuple <aa, cg> and weight $w_4 \otimes w_5$) for illustrating a simple example of the single-tape intersection operation $$A_1^{(3)} \underset{3,2}{\cap} A_2^{(2)}$$

(where the final state of each automaton also has a weight). The resulting cross-product WMTA $A_3^{(5)}$ of the two WMTAs $A_1^{(3)}$ and $A_2^{(2)}$ results in the following two string tuples (see 302 FIG. 3): <ax, by, cz, aa, cg> having weight $w_1 \otimes w_2 \otimes w_4 \otimes w_5$ and <ae, bf, cg, aa, cg> having weight $w_1 \otimes w_3 \otimes w_4 \otimes w_5$. In comparing tapes 3 and 5 of the cross-product WMTA $A_3^{(5)}$ (see 308 in FIG. 3), the following strings are compared for each string tuple of the cross-product WMTA $A_3^{(5)}$, respectively: "cz" and "cg"; and "cg" and "cg".

In the example shown in FIG. 4, one set of strings at the selected tapes 3 and 2 are equal, which results in the retention of the string tuple <ae, bf, cg, aa, cg> in the cross-product WMTA $A_3^{(5)}$ (see 312 in FIG. 3). Also in the example, one set of strings at the selected tapes 3 and 5 in the cross-product WMTA $A_3^{(5)}$ are not equal, resulting in the restructuring of the cross-product WMTA to remove the string tuple <ax, by, cz, aa, cg> through auto-intersection as WMTA $A_4^{(5)} = I_{(3,5)}(A_3^{(5)})$ (see 314 in FIG. 3). Finally, redundant strings in the string tuple retained in the cross-product WMTA $A_4^{(5)}$ are removed through complementary projection $A_5^{(4)} = \overline{\mathcal{P}}(A_4^{(5)})$ to result in the simplified string tuple <ae, bf, cg, aa> for the WMTA $A_5^{(4)}$ (see 318 in FIG. 3).

B.6 Multi-Tape Intersection

Multi-tape intersection of two multi-tape languages, $\mathcal{L}_1^{(n)}$ and $\mathcal{L}_2^{(m)}$, uses r tapes in each language, and intersects them pair-wise. In other words, multi-tape intersection is an operation that involves intersecting several tapes of a first MTA with the same number of tapes of a second MTA. Multi-tape intersection is a generalization of single-tape intersection, and is defined as:

$$\mathcal{L}_1^{(n)} \bigcap_{j_1, k_1} \mathcal{L}_2^{(m)} =_{def} \mathcal{P}_{n+k_1,\ldots,n+k_r}(\mathcal{I}_{j_r,n+k_r}( \ldots \mathcal{I}_{j_1,n+k_1}(\mathcal{L}_1^{(n)} \times L_2^{(m)}) \ldots ))$$

$$\ldots$$
$$j_r, k_r$$

The multi-tape intersection operation pairs each string tuple $s^{(n)} \in \mathcal{L}_1^{(n)}$ with each string tuple $v^{(m)} \in \mathcal{L}_2^{(m)}$ iff $s_{j_1} = v_{k_1}$ until $s_{j_r} = v_{k_r}$. The resulting language $\mathcal{L}^{(n+m-r)}$ is defined as:

$$\mathcal{L}^{(n+m-r)} = \{u^{(n+m-r)} | u^{(n+m-r)} = \overline{\mathcal{P}}_{n+k_1}^{n+k_r}$$
$$(s^{(n)} : v^{(m)}), s^{(n)} \in \mathcal{L}_1^{(n)}, v^{(m)} \in \mathcal{L}_2^{(m)}, s_{j_1} = v_{k_1}, \ldots,$$
$$s_{j_r} = v_{k_r}\}$$

weight w:

$$w(u^{(n+m-r)}) = w(s^{(n)}) \otimes w(v^{(m)}).$$

All tapes $k_i$ of language $\mathcal{L}_2^{(n_2)}$ that have directly participated in the intersection are afterwards equal to the tapes $j_i$ of $\mathcal{L}_1^{(n_1)}$, and are removed. Multi-tape intersection is neither associative nor commutative (except for special cases).

B.7 Transition Automata and Transition-Wise Processing

A transition automaton $\mathcal{A}(e)$ is defined herein as an automaton containing only one single transition e that actually belongs to another automaton A. Any automaton operation is allowed to be performed on $\mathcal{A}(e)$, which means that the operation is performed on one single transition of A rather than on A. This can be thought of either as the operation being performed in place (i.e., inside A on one single transition) or as the transition being extracted from A and placed into a new automaton $\mathcal{A}(e)$ that participates in an operation whose result is then placed back into A, at the original location of e.

The concept of transition automata allows a method to be defined where an automaton A is transition-wise processed (i.e., each of its transitions is processed independently through a sequence of automaton operations). In the following example that illustrates the transition automata $\mathcal{A}(e)$ being transition-wise processed, e is one transition in a set of transitions E of automata A:

```
1  for ∀e ∈ E do
2      A(e) ← A₁⁽²⁾ ◊ A(e) ◊ A₂⁽²⁾
3      A(e) ← … A(e) …
```

C. Methods for Performing MTA Operations

This section sets forth methods for performing multi-tape operations for automata defined in section B, while referring to the variables and definitions in Table 1. Note that in Table 1 the following variables serve for assigning temporarily additional data to a state q: $\mu[q]$, $\nu[q]$, $\xi[q]$, $\vartheta[q]$ and $\chi[q]$.

TABLE 1

| | |
|---|---|
| $A_j = \langle \Sigma_j, Q_j, i_j, F_j, E_j, \mathcal{K}_j \rangle$ | Specific (original) weighted automaton from which a new weighted automaton A is constructed |
| $A = \langle \Sigma, Q, i, F, E, \mathcal{K} \rangle$ | New weighted automaton resulting from the construction |
| $\nu[q] = q_1$ | State $q_1$ of an original automaton $A_1$ assigned to a state q of a new automaton A |
| $\mu[q] = (q_1, q_2)$ | Pair of states $(q_1, q_2)$ of two ordinal automata, $A_1$ and $A_2$, assigned to a state q of a new automaton A |
| $\psi[q] = \ddot{q}$ | Previous state $\ddot{q}$ in the new automaton A on the same path as q (back pointer) |

TABLE 1-continued

| | |
|---|---|
| $\upsilon[q] = (q_1, q_2, q_\epsilon)$ | Triple of states $q_1, q_2, q_\epsilon$ belonging to the original automata, $A_1$ and $A_2$, and to a simulated filter automaton, $A_\epsilon$, respectively; assigned to a state q of a new automaton A |
| $\xi[q] = (s, u)$ | Pair of "leftover" substrings (s, u) assigned to a state q of a new automaton A |
| lcp(s, s') | Longest common prefix of the strings s and s' |
| $l_{j,k,\ldots}(x) = \mathcal{P}_{j,k,\ldots}(l(x))$ | Short-hand notation for the projection of the label x |
| $\delta(s, u) = |s| - |u|$ | Delay between two string (or leftover substrings) s and u, where \|s\| is the length of string s and \|u\| is the length of string u. Example: $\delta(\xi[q])$ |
| $\chi[q] = (\chi_1, \chi_2)$ | Pair of integers assigned to a state q, expressing the lengths of two strings s and u on different tape of the same path ending at q |

C.1 Cross-Product

Generally, this section sets forth two alternate embodiments for performing the cross-product operation defined in section B-3, and more specifically for compiling the cross product of two WMTAs, $A_1^{(n)}$ and $A_2^{(m)}$.

The first embodiment pairs the label of each transition $e_1 \in E_1$ with $\epsilon^{(m)}$ (producing $l(e_1):\epsilon^{(m)}$), and the label of each transition $e_2 \in E_2$ with $\epsilon^{(n)}$ (producing $\epsilon^{(n)}:l(e_2)$), and finally concatenates $A_1^{(n+m)}$ with $A_2^{(n+m)}$. This operation is referred to herein as "CrossPC $(A_1, A_2)$" where the suffix "PC" stands for "path concatenation" and can be expressed as:

$$l(\pi_1^{(n)}:\pi_2^{(m)}) = (l(e_{1,1}^{(n)}):\epsilon^{(m)})\ldots(l(e_{1,\alpha}^{(n)}):\epsilon^{(m)}) \cdot (\epsilon^{(n)}:l(e_{2,1}^{(m)}))\ldots(\epsilon^{(n)}:l(e_{2,\beta}^{(m)})).$$

The second embodiment pairs each string tuple of $A_1^{(n)}$ with each string tuple of $A_2^{(m)}$, following the definition in section B-3. This embodiment in actuality pairs each path $\pi_1$ of $A_1^{(n)}$ with each path $\pi_2$ of $A_2^{(m)}$ transition-wise, and appends epsilon transitions (i.e., $\epsilon$-transitions) to the shorter of two paired paths, so that both have equal length. This operation is referred to herein as "CrossPA $(A_1, A_2)$" where the suffix "PA" stands for "path alignment" and can be expressed as:

$$l(\pi_1^{(n)}:\pi_2^{(m)}) = (l(e_{1,1}^{(n)}):l(e_{2,1}^{(m)}))\ldots(l(e_{1,\alpha}^{(n)}):l(e_{2,\alpha}^{(m)})) \cdot (\epsilon^{(n)}:l(e_{2,\alpha+1}^{(m)}))\ldots(\epsilon^{(n)}:l(e_{2,\beta}^{(m)}))$$

for $\alpha < \beta$, and similarly otherwise.

C.1.1 Conditions

Both embodiments for performing the cross-product operation operate he conditions that:

(A) the semirings of the two automata $A_1^{(n)}$ and $A_2^{(m)}$ are equal to: $\mathcal{K}_1 = \mathcal{K}_2$; and (B) the common semiring $\mathcal{K} = \mathcal{K}_1 = \mathcal{K}_2$ is commutative (which holds in the CrossPA embodiment only):

$$\forall w_1, w_2 \in \mathcal{K}: w_1 \otimes w_2 = w_2 \otimes w_1.$$

C.1.2 Path Concatenation Method

A (brute force) method for performing the cross-product operation in accordance with an embodiment, defined as "CrossPC( )", with path concatenation "PC" may be described as follows in pseudocode:

```
CROSSPC(A₁⁽ⁿ⁾, A₂⁽ᵐ⁾) → A :

1   A ← ⟨Σ₁ ∪ Σ₂, Q₁ ∪ Q₂, i₁, F₂, E₁ ∪ E₂, K₁⟩
2   for ∀e₁ ∈ E₁ do
3       l(e₁) ← l(e₁):ε⁽ᵐ⁾
4   for ∀e₂ ∈ E₂ do
5       l(e₂) ← ε⁽ⁿ⁾:l(e₂)
6   for ∀q ∈ F₁ do
7       E ← E ∪ { ⟨q, ε⁽ⁿ⁺ᵐ⁾, ℓ(q), i₂⟩ }
8       ℓ(q) ← 0̄
9   return A
```

The pseudocode set forth above for cross-product path concatenation (i.e., CrossPC( )) starts with a WMTA A that is equipped with the union of the alphabets (i.e., the union of the state sets of transducers $A_1$ and $A_2$). The initial state of A equals that of $A_1$, its set of final states equals that of $A_2$, and its semiring equal those of $A_1$ and $A_2$ (see line 1). First, the labels of all transitions originally coming from $A_1$ are (post-) paired with $\epsilon^{(m)}$-transitions, and the labels of all transitions originally coming from $A_2$ are (pre-) paired with $\epsilon^{(n)}$-transitions. Subsequently, all final states of $A_1$ are connected with the initial state of $A_2$ through $\epsilon^{(n+m)}$-transitions. As a result, each string n-tuple of $A_1$ will be physically followed by each string m-tuple of $A_2$. However, logically those string tuples will be paired since they are on different tapes.

It will be appreciated by those skilled in the art that the paths of the WMTA A become longer in this embodiment than the other embodiment with path alignment. In addition, it will be appreciated that each transition of A in this embodiment is partially labeled with an epsilon, which may increase the runtime of subsequent operations performed on A. Further it will be appreciated that this embodiment may be readily adapted to operate with non-weighted multi-tape automata (MTAS) by removing the weight $\varrho(q)$ from line 7 and the semiring $\mathcal{K}_1$ from line 1 and by replacing line 8 with "Final (q)←false", in the pseudocode above for path concatenation (i.e., CrossPC( )).

C.1.3 Path Alignment Method

FIG. 5 sets forth a second embodiment in pseudocode for performing the cross-product operation with path alignment "PA" (i.e., CrossPA( )). In FIG. 5, the final weight of an undefined state $q=\perp$ is assumed to be $\bar{1}: \varrho(\perp) = \bar{1}$. In the embodiment shown in FIG. 5, the pseudocode starts with a WMTA A whose alphabet is the union of the alphabets of $A_1$ and $A_2$, whose semiring equals those of $A_1$ and $A_2$, and that is otherwise empty (see line 1). First, the initial state i of A is created from the initial states $A_1$ and $A_2$ (at line 3), and i is pushed onto the stack (at line 4) which was previously initialized (at line 2). While the stack is not empty, the states q are popped from it to access the states $q_1$ and $q_2$ that are assigned to q through u[q] (see lines 5 and 6).

Further in the embodiment shown in FIG. 5, if both $q_1$ and $q_2$ are defined (i.e., $\neq \perp$), each outgoing transition $e_1$ of $q_1$ is paired with each outgoing transition of $e_2$ of $q_2$ (see lines 7 to 9). Also (at line 13), a transition in A is created whose label is the pair $l(e_1):l(e_2)$ and whose target q' corresponds to the tuple of targets $(n(e_1), n(e_2))$. If q' does not exist yet, it is created and pushed onto the stack (see lines 10 to 12).

In addition in the embodiment shown in FIG. 5 (at lines 14 and 15), if a final state $q_1$ (with $\varrho(q_1) \neq \bar{0}$) in $A_1$ is encountered, the path is followed beyond $q_1$ on an epsilon-transition that exists only locally (i.e., virtually) but not physically in $A_1$. The target of the resulting transition in A corresponds to the tuple of targets $(n(e_1), n(e_2))$ with $n(e_1)$ being undefined $(=\perp)$ because $e_1$ does not exist physically (see line 17). If a final state $q_2$ (with $\varrho(q_2) \neq \bar{0}$) in $A_2$ is encountered, it is processed similarly (see lines 20 to 25). It will be appreciated by those skilled in the art that this embodiment may be readily adapted to operate with non-weighted multi-tape automata (MTAs) by removing the weights from lines 13, 19, and 25, and the semiring $\mathcal{K}_1$ from line 1, and the and by replacing line 28 with "Final(q)←Final(q₁)·Final(q₂)", in the pseudocode shown in FIG. 5.

C.1.4 Complexity

The space complexity of the (brute-force) cross-product path concatenation embodiment described in section C.1.2 is $|Q_1|+|Q_2|$ (i.e., on the order of O(n)) and its running complexity is $|F_1|$. In contrast, the space complexity of the cross-product path alignment embodiment described in section C.1.3 is $(|Q_1|+1)\cdot(|Q_2|+1)$ (i.e., on the order of $O(n^2)$) and its running complexity is $(|E_1|+1)\cdot(|E_2|+1)$.

C.2 Auto-Intersection

This section describes two methods for performing the auto-intersection operation defined in section B.4.

C.2.1 Conditions of First Method

The method described for performing auto-intersection operation in this section operates under the condition that the original automaton $A_1^{(n)}$ does not contain cycles labeled only with an epsilon on one and not only with an epsilon on the other of the two tapes involved in the operation. If condition occurs the method will stop without producing a result, rather than attempting to create an infinite number of states. It is assumed this undesirable condition occurs rarely (if at all) in natural language processing applications (see for example FIG. 8).

C.2.2 First Method

FIG. 6 sets forth a first method in pseudocode for performing the auto-intersection operation (i.e., AutoIntersect( )). Line 1 of the pseudocode begins with a WMTA A whose alphabet and semiring equal those of $A_1$ and that is otherwise empty. To each state q that will be created in A (see line 3), three variables are assigned: (i) $v[q]=q_1$ that indicates the corresponding state $q_1$ in $A_1$ (see line 24), (ii) $\Psi[q]=\check{q}$ that indicates the previous state $\check{q}$ in A on the current path (back pointer) (see line 25), and (iii) $\xi[q]=(s,u)$ that states the leftover string s of tape j (yet unmatched in tape k) and leftover string u of tape k (yet unmatched in tape j) (see line 26).

At lines 3-4 and 20-27, an initial state i in A is created and pushed onto the stack defined at line 2. As long as the stack is not empty, the states q are popped from the stack and each of the outgoing transitions $e_1 \in E(q)$ in A with the same label and weight are followed (see line 5). To compile the leftover strings $\xi[q']=(s', u')$ of its target $q'=n(e)$ in A, the leftover strings $\xi[q]=(s,u)$ of its source $q=p(e)$ are concatenated with the j-th and k-th component of its label, $l_j(e_1)$ and $l_k(e_1)$, and the longest common prefix of the resulting string $s \cdot l_j(e_1)$ and $u \cdot l_k(e_1)$ is removed (see lines 7 and 16-19).

If both leftover strings s' and u' of q' are non-empty (i.e., $\neq \epsilon$) then they are incompatible and the path that is being followed is invalid. In this case, the transition $e \in E(q)$ and its target q' in A are not constructed. If either s' or u' is empty (i.e., $=\epsilon$), then the current path is valid (at least up to this point) (see line 8).

At line 9, a test is made to determine whether the process will not terminate, which is the case if a cycle in $A_1$ was traversed and the $\xi[\check{q}]$ at the beginning of the cycle differs from the $\xi[n(e)]=(s',u')$ at its end. In this case the states $\check{q}$ and n(e) are not equivalent, and cannot be represented through one state in A, although they correspond to the same state $q_1$ in $A_1$. In order that the process does not traverse the cycle an infinite number of times and create a new state on each transversal, the process aborts at line 10.

At line 14 (if the process did not abort at line 10), a transition e in A is constructed. If its target q'=n(e) does not exist yet, it is created and pushed onto the stack at lines 11-13. It will be appreciated by those skilled in the art that this embodiment may be readily adapted to operate with non-weighted multi-tape automata (MTAs) by removing the weight $w(e_1)$ from line 14 and the semiring $\mathcal{K}_1$ from line 1, and by replacing line 22 with "Final(q)←Final($q_1$)" and line 23 with "Final (q)←false", in the pseudocode shown in FIG. 6.

C.2.3 Example of First Method

Figure 7:
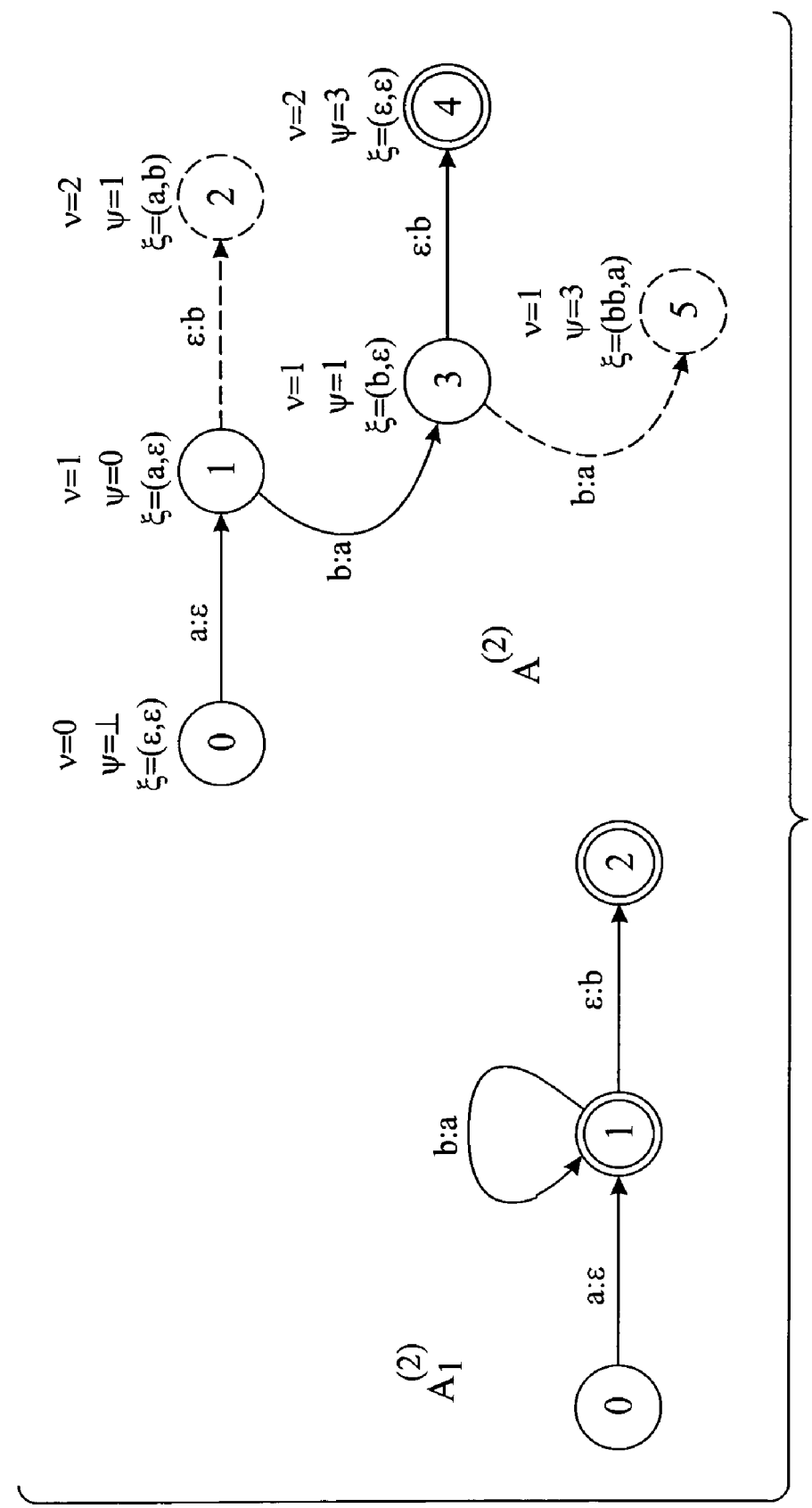
FIG. 7 presents two automata for illustrating the method for performing the auto-intersection operation set forth in FIG. 6.

FIG. 7 illustrates an example of the first method for performing the auto-intersection operation shown in FIG. 6. In the example shown in FIG. 7, the language of $A_1^{(2)}$ is the infinite set of string tuples $\langle ab^{*1}, a^{*1}b \rangle$. Only one of those tuples, namely ⟨ab, ab⟩, is in the language of the auto-intersection with $A^{(2)}=I_{1,2}(A_1^{(2)})$ because all other tuples contain different strings on tapes 1 and 2. In FIG. 7, weights of each WMTA are omitted and dashed states and transitions are not constructed.

The method described above in section C.2.2 builds first the initial state 0 of $A^{(2)}$ with v[0]=0, Ψ[0]=⊥, and ξ[0]=(ϵ,ϵ). Then the only outgoing transition of the state referenced by v[0] is selected, which is labeled a:ϵ, and the leftover strings of its target, state 1, is compiled by concatenating ξ[0]=(ϵ,ϵ) with the label a:ϵ. This gives first (a,ϵ) and then, after removal of the longest comment prefix (ϵ in this case), ξ[1]=(a,ϵ). State 1 is created because ξ[1] meets the constrains defined in the method. It is assigned v[1]=1, because it corresponds to state 1 in $A_1$, Ψ[1]=0, because it is (at present) reached from state 0 in A, and ξ[1]=(a,ϵ). State 1 in A is not final (unlike state 1 in $A_1$) because ξ[1]≠(ϵ,ϵ).

The remaining strings of state 2 in A result from ξ[1]=(a,ϵ) and the transition label ϵ:b, and are ξ[2]=(a,b). State 2 and its incoming transition are not created because ξ[2] does not meet the defined constraints. All other states and transitions are similarly constructed.

Figure 8:
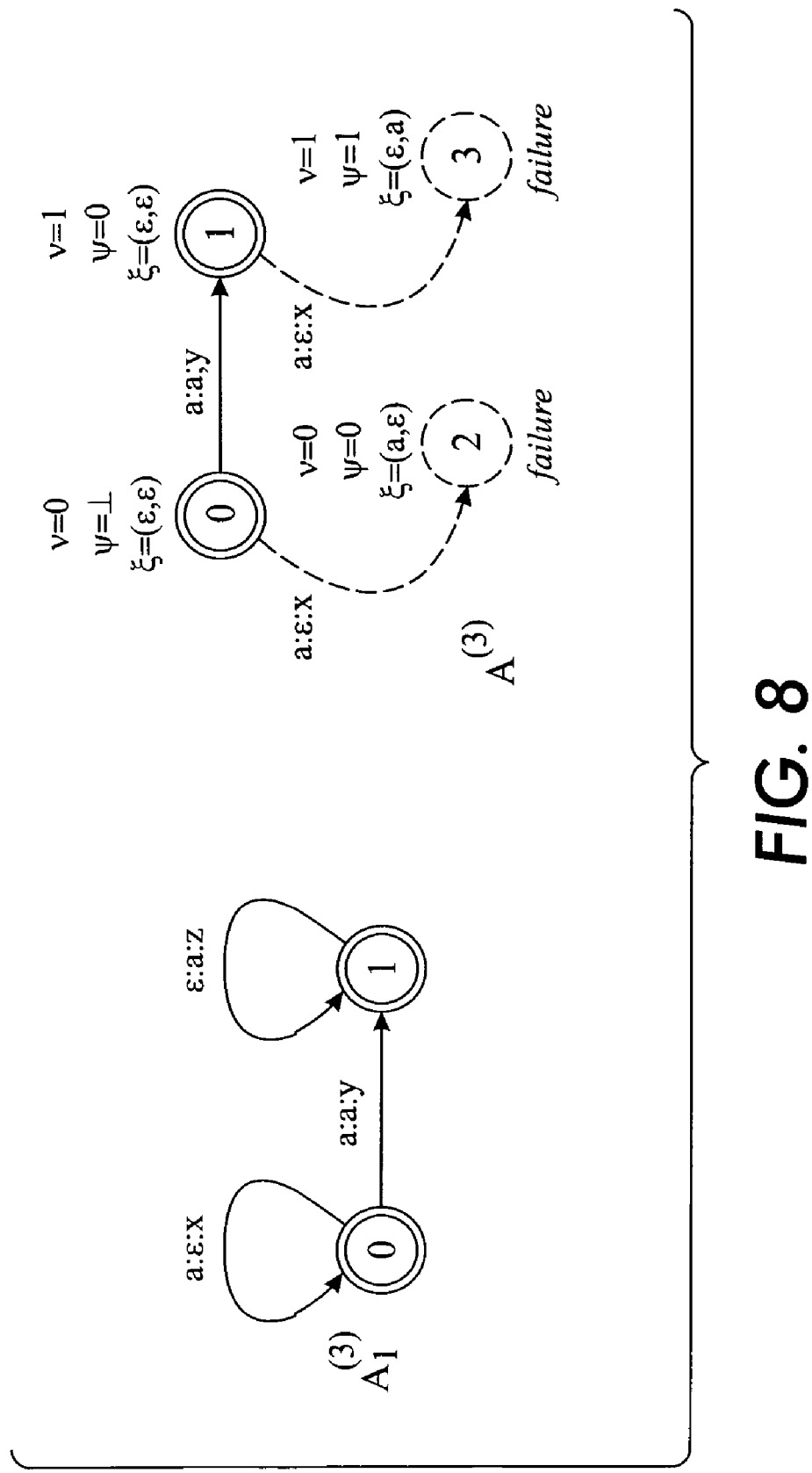
FIG. 8 presents two automata for illustrating an example of the method for performing the auto-intersection operation set forth in FIG. 6 that fails to perform auto-intersection.

FIG. 8 illustrates an example where the first method for performing the auto-intersection operation shown in FIG. 6 fails to construct the auto-intersection whose language, $\langle a^{*1}a, aa^{*1}, x^{*1}yz^{*1} \rangle$, and is actually not finite-state (see conditions in section C.2.1). The failure condition is met at states 2 and 3 of the new automaton A. In FIG. 8, weights of each WMTA are omitted and dashed states and transitions are not constructed.

C.2.4 Conditions of Second Method

The second method unlike the first method has no conditions. In accordance with the second method for performing auto-intersection, the second method detects whether the auto-intersection of a given WMTA $A_1^{(n)}$ is regular (i.e., whether it can be represented as an automaton). If it is found to be regular, the second method creates a WMTA $A=I_{j,k}(A_1^{(n)})$; otherwise if it is found not to be regular and the complete result cannot be represented by an automaton, the second method creates the automaton $A \subset I_{j,k}(A_1^{(n)})$, which is a partial result.

Briefly, the second method performs auto-intersection by assigning leftover-strings to states using variable ξ[q]=(s,u) and makes use of the concept of delay using variable δ(s,u), which are both defined in Table 1. The variable χ[q] defines a pair of integers assigned to a state q, which expresses the lengths of two strings s and u on different tape of the same path in a WMTA ending at q. The concept of delay provides that given a path in a WMTA, the delay of its states q is the difference of lengths of the strings on the tapes j and k up to q. It is expressed as the function δ(s,u)=|s|−|u|, where |s| is the length of string s and |u| is the length of string u.

C.2.5 Second Method

FIG. 9 sets forth the second method in pseudocode for performing the auto-intersection operation (i.e., AutoIntersect( )). The method is based on the observation that if the auto-intersection $A^{(n)}=I_{j,k}(A_1^{(n)})$ of a WMTA $A_1^{(n)}$ is regular, the delay will not exceed a limit $\delta_{max}$ at any state q of $A^{(n)}$. If it is not regular, the delay will exceed any limit, but it is possible to construct a regular part, $A_p^{(n)}$, of the auto-intersection within the limit of $\delta_{max}$ and a larger regular part, $A_{p2}^{(n)}$, within a larger limit $\delta_{max2}$ (i.e., $A_p^{(n)} \subset A_{p2}^{(n)} \subset I_{j,k}(A_1^{(n)})$).

By way of overview, the second method set forth in FIG. 9 and described in detail below involves three operations. First, two limits are computed corresponding to delays $\delta_{max}$ and $\delta_{max2}$ of the auto-intersection (i.e., line 1). The first delay $\delta_{max}$ is computed by traversing the input automaton and measuring the delays along all its paths. The second delay is computed similar to the first delay while traversing an additional cycle of the input automaton. Next, the auto-intersection of the automaton is constructed using the delay $\delta_{max2}$ (i.e., lines 2-10, where the second limit serves to delimit construction of the automaton). Finally, the constructed automaton is tested for regularity using the delay $\delta_{max}$ (i.e., line 11, where the first limit serves to determine whether the auto-intersection is regular).

C.2.5.A Compile Limits

In FIG. 9, a maximal delay, $\delta_{max}$, is compiled. The maximal delay, $\delta_{max}$, can occur at any point between the two strings $l_j(\pi)$ and $l_k(\pi)$ on any path π of $I_{j,k}(A_1^{(n)})$ if it is regular. Let $\mathcal{R}(A_1^{(2)})=(\{\langle aa, \epsilon \rangle\} \subset \{\langle \epsilon, aaa \rangle\})^*$, encoded by two cycles (as provided at lines 1 and 27-42), where $\mathcal{R}(A^{(n)})$ is the n-tape relation of $A^{(n)}$. To obtain a match between $l_1(\pi)$ and $l_2(\pi)$ in $A^{(2)}=I_{1,2}(A_1^{(2)})$, the first cycle must be traversed three times and the second cycle two times, allowing for any permutation: $A^{(2)}=(\langle aa, \epsilon \rangle^3 \langle \epsilon, aaa \rangle^2 \cup \langle aa, \epsilon \rangle^2 \langle \epsilon, aaa \rangle^2 \langle aa, \epsilon \rangle^1 \cup \ldots)^*$. This illustrates that in a match between any two cycles of $A_1^{(n)}$, the absolute value of the delay does not exceed $\delta_{cyc}=\hat{\delta}_{cyc}\cdot\max(1, \delta_{cyc}-1)$, with $\hat{\delta}_{cyc}$ being the maximal absolute value of the delay of any cycle (as provided at line 30). For any other kind of match, the difference between the maximal and the minimal delay, $\hat{\delta}_{max}$ and $\hat{\delta}_{min}$, encountered at any (cyclic or acyclic) path π of $A_1^{(n)}$ is taken into account. Therefore, the absolute value of the delay in $A^{(n)}$ does not exceed $\delta_{max}=\max(\hat{\delta}_{max}-\hat{\delta}_{min}, \delta_{cyc})$ if $I_{j,k}(A_1^{(n)})$ is regular (as provided at line 31). If it is non-regular, then $\delta_{max}$ will limit $A^{(n)}$ to a regular subset of the auto-intersection, $A^{(n)} \subset I_{j,k}(A_1^{(n)})$.

Next, a second limit, $\delta_{max2}$, is compiled that permits, in case of non-regularity, to construct a larger regular subset $A^{(n)} \subset I_{j,k}(A_1^{(n)})$ than $\delta_{max}$ does. Non-regularity can only result from matching cycles in $A_1^{(n)}$. To obtain a larger subset of $I_{j,k}(A_1^{(n)})$, the cycles of $A_1^{(n)}$ must be unrolled further until one more match between two cycles is reached. Therefore, $\delta_{max2}=\delta_{max}+\delta_{cyc}$ (as provided at line 32).

C.2.5.B Construct Auto-Intersection

Construction starts with a WMTA A whose alphabet and semiring equal those of $A_1$ and that is otherwise empty (as provided at line 2). To each state q that will be created in WMTA A, two variables are assigned: (i) v[q]=$q_1$ indicating the corresponding state $q_1$ in $A_1$; and (ii) ξ[q]=(s,u), which sets forth the leftover string s of tape j (yet unmatched in tape k) and the leftover string u of tape k (yet unmatched in tape j).

Subsequently, an initial state i in A is created and pushed onto a stack (as provided at lines 4 and 17-26). As long as the stack is not empty, states q are taken from it and each of the outgoing transitions $e_1 \in E(q_1)$ of the corresponding state $q_1$=v[q] in $A_1$ are followed (as provided in lines 5 and 6). A transition $e_1$ in $A_1$ is represented as e∈E(q) in A, with the same label and weight. To compile the leftover strings $\xi[q']=(s', u')$ of its target $q'=n(e)$ in A, the leftover strings $\xi[q]=(s, u)$ of its source $q=p(e)$ are concatenated with the j-th and k-th component of its label, $l_j(e_1)$ and $l_k(e_1)$, and the longest common prefix of the resulting strings $s \cdot l_j(e_1)$ and $u \cdot l_k(e_1)$ is removed (as provided in lines 7 and 13-16).

If both leftover strings s' and u' of q' are non-empty (i.e., $\neq \epsilon$) then they are incompatible and the path that is being followed is invalid. If either s' or u' is empty $\epsilon$ (i.e., $=\epsilon$) then the current path is valid (at least up to this point) (as provided in line 8). Only in this case and only if the delay between s' and u' does not exceed $\delta_{max2}$, a transition e in A is constructed corresponding to $e_1$ in $A_1$ (as provided in line 10). If its target $q'=n(e)$ does not exist yet, it is created and pushed onto the stack (as provided in lines 9 and 17-26). The infinite unrolling of cycles is prevented by $\delta_{max2}$.

C.2.5.C Test Regularity of Auto-Intersection

Finally, the constructed auto-intersection of the WMTA A is tested for regularity. From the above discussion of $\delta_{max}$ and $\delta_{max2}$ it follows that if $I_{j,k}(A_1^{(n)})$ is regular then none of the states that are both reachable and coreachable have $|\delta(\xi[q])| > \delta_{max}$. Further, if $I_{j,k}(A_1^{(n)})$ is non-regular then a WMTA $A^{(n)}$ built having a $\delta_{max2}$, is bigger than a WMTA $A^{(n)}$ built having $\delta_{max}$, and hence has states with $|\delta(\xi[q])| > \delta_{max}$ that are both reachable and coreachable. Since all states of $A^{(n)}$ are reachable, due to the manner in which the WMTA A is constructed, it is sufficient to test for their coreachability (as provided at line 11) to know whether the WMTA A is regular (i.e., the delay of WMTA $A^{(n)}$ will not exceed a limit $\delta$ max at any state q of $A^{(n)}$).

C.2.6 Examples of Second Method

Figure 10:
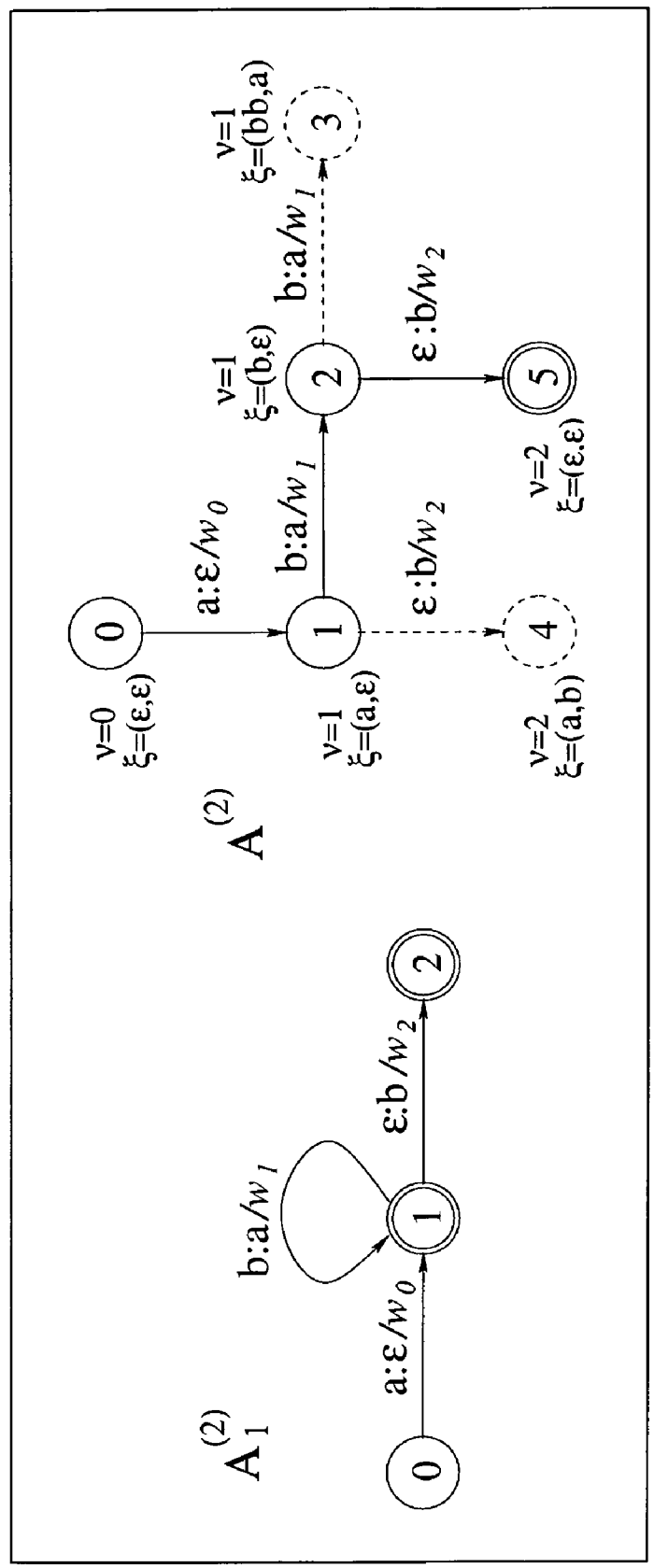
FIGS. 10 and 11 each present two automata for illustrating the method for performing the auto-intersection operation set forth in FIG. 9 which results in a WMTA $A^{(n)}$ that is regular.
Figure 11:
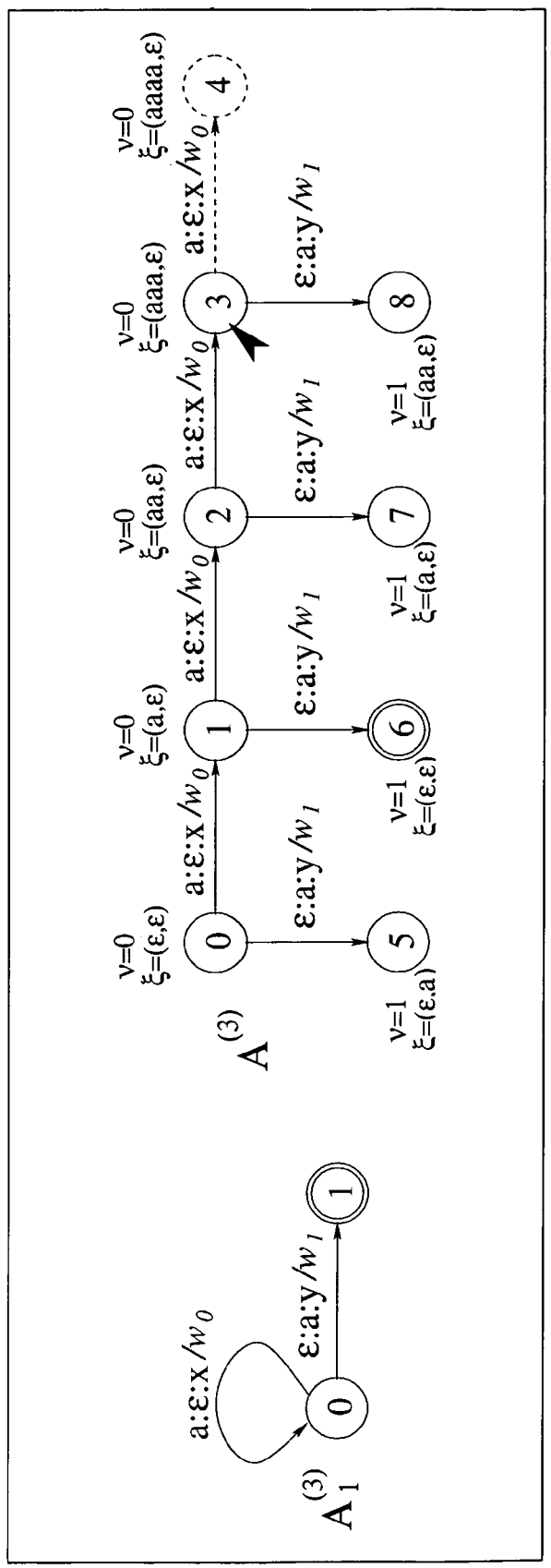
Figure 12:
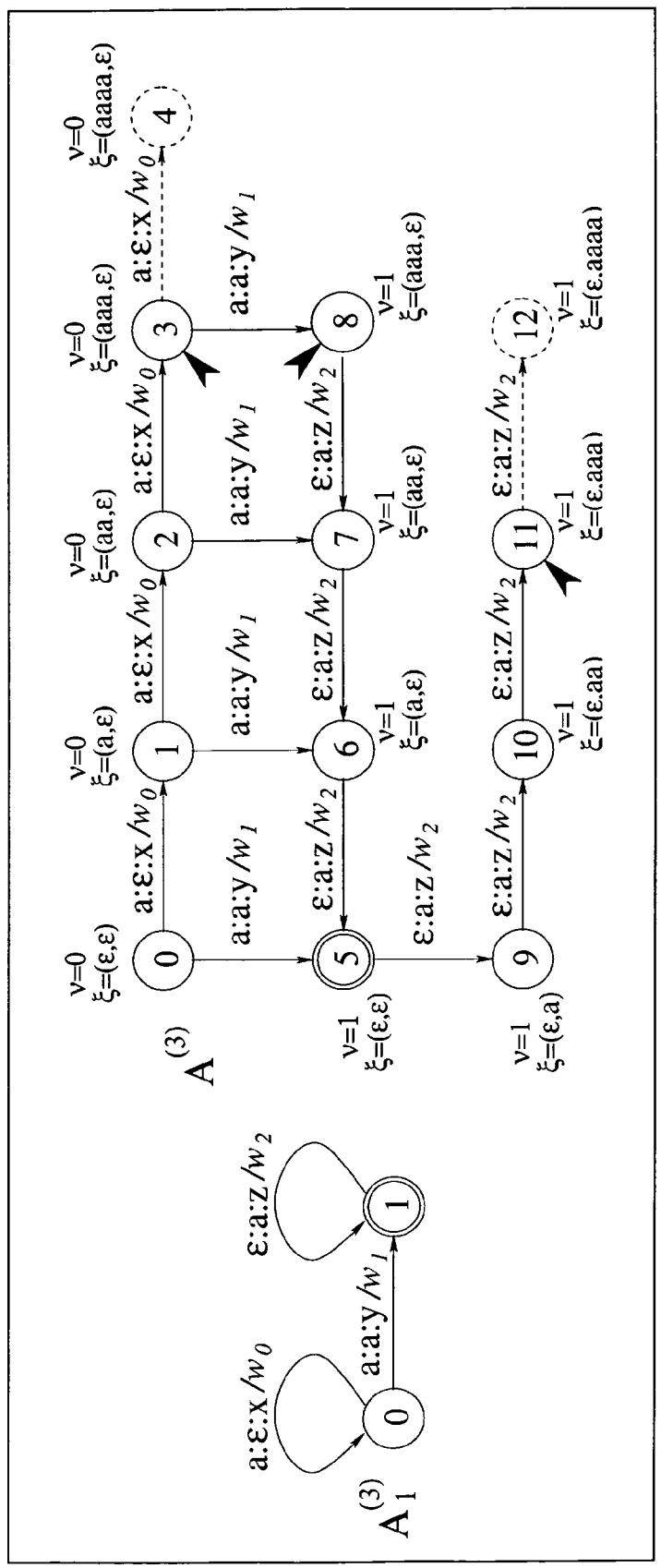
FIG. 12 presents two automata for illustrating an example of the method for performing the auto-intersection operation set forth in FIG. 9 which results in a WMTA $A^{(n)}$ that is not regular.

FIGS. 10 and 11 each present two different automata for illustrating the method for performing the auto-intersection operation set forth in FIG. 9 which results in a WMTA $A^{(n)}$ that is regular. In contrast, FIG. 12 presents two automata for illustrating an example of the method for performing the auto-intersection operation set forth in FIG. 9 which results in a WMTA $A^{(n)}$ that is not regular. In the FIGS. 10-12, the dashed portions are not constructed by the method set forth in FIG. 9, and the states q in the Figures identified with the arrow "➤" have delay such that $|\delta(\xi[q])| > \delta_{max}$.

FIG. 10 illustrates the WMTA $A_1^{(2)}$ and its auto-intersection $A^{(2)}$. In FIG. 10, the WMTA $A_1^{(2)}$ is the infinite set of string tuples $\{\langle ab^k, a^k b\rangle | k \in \mathbb{N}\}$ (where $\mathbb{N}$ is the set of natural numbers). Only one of those tuples, namely (ab, ab), is in the relation of the auto-intersection $A^{(2)}=I_{1,2}(A_1^{(2)})$ because all other tuples contain different strings on tape 1 and tape 2. In accordance with the method for performing the auto-intersection operation set forth in FIG. 9, the following four steps are performed (namely, at (1) the limits are computed, at (2)-(3) the auto-intersection is computed, and at (3) the auto-intersection is tested for regularity):

$$\delta_{max} = \delta_{max2} = 1 \tag{1}$$

$$\mathcal{R}(A_1^{(2)}) = \{\langle ab^k, a^k b\rangle | k \in \mathbb{N}\} \tag{2}$$

$$I_{1,2}(\mathcal{R}(A_1^{(2)})) = \mathcal{R}(A^{(2)}) = \{\langle ab^1, a^1 b\rangle\} \tag{3}$$

$$\nexists q \in Q: |\delta(\xi[q])| > \delta_{max} \rightarrow \text{regular} \tag{4}$$

FIG. 11 illustrates the WMTA $A_1^{(3)}$ and its auto-intersection $A^{(3)}=I_{1,2}(A_1^{(3)})$, where the state 3 of $A^{(2)}$ in FIG. 11 identified with the arrow "➤" has a delay such that $|\delta(\xi[q])| > \delta_{max}$. In accordance with the method for performing the auto-intersection operation set forth in FIG. 9, the following four steps are performed (namely, at (1)-(2) the limits are computed, at (3)-(4) the auto-intersection is computed, and at (5) the auto-intersection is tested for regularity):

$$\delta_{max} = 2 \tag{1}$$

$$\delta_{max2} = 3 \tag{2}$$

$$\mathcal{R}(A_1^{(3)}) = \{\langle a^k, a, x^k y\rangle | k \in \mathbb{N}\} \tag{3}$$

$$I_{1,2}(\mathcal{R}(A_1^{(3)})) = \mathcal{R}(A^{(3)}) = \{\langle a^1, a, x^1 y\rangle\} \tag{4}$$

$$\nexists q \in Q: |\delta(\xi[q])| > \delta_{max} \wedge \text{coreachable}(q) \rightarrow \text{regular} \tag{5}$$

FIG. 12 illustrates the WMTA $A_1^{(3)}$ and its auto-intersection $A^{(3)}=I_{1,2}(A_1^{(3)})$, where the states 3, 8, and 11 of $A^{(2)}$ in FIG. 12 identified with the arrow "➤" have a delay such that $|\delta(\xi[q])| > \delta_{max}$. In accordance with the method for performing the auto-intersection operation set forth in FIG. 9, the following four steps are performed (namely, at (1)-(2) the limits are computed, at (3)-(5) the auto-intersection is computed, and at (6) the auto-intersection is tested for regularity):

$$\delta_{max} = 2 \tag{1}$$

$$\delta_{max2} = 3 \tag{2}$$

$$\mathcal{R}(A_1^{(3)}) = \{\langle a^k a, aa^h, x^k yz^h\rangle | k, h \in \mathbb{N}\} \tag{3}$$

$$I_{1,2}(\mathcal{R}(A_1^{(3)})) = \{\langle a^k a, aa^k, x^k yz^k\rangle | k \in \mathbb{N}\} \tag{4}$$

$$I_{1,2}(\mathcal{R}(A_1^{(3)})) \supset \mathcal{R}(A^{(3)}) = \{\langle a^k a, aa^k, x^k yz^k\rangle | k \in [[0, 3]]\} \tag{5}$$

$$\exists q \in Q: |\delta(\xi[q])| > \delta_{max} \wedge \text{coreachable}(q) \rightarrow \text{non-regular} \tag{6}$$

C.3 Single-Tape Intersection

This section sets forth two alternate embodiments for performing, in one step, the single-tape intersection operation of two WMTAs $A_1^{(n)}$ and $A_2^{(m)}$ defined in section B.5 above. Instead of first building the cross-product, $A_1^{(n)} \times A_2^{(m)}$, and then deleting most of its paths by the auto-intersection, $I_{j,n+k}(\ )$ operation defined in section B.4, both embodiments construct only the useful part of the cross-product. However, it will be understood by those skilled in the art that an alternate embodiment follows the definition and performs single-tape intersection in multiple steps.

The first embodiment is a method for performing single-tape intersection similar to known methods for performing composition, and is not adapted to handle WMTAs that contain epsilons on the intersected tapes, j and k. The first embodiment is referred to herein as IntersectCross($A_1, A_2, j, k$), which is defined as:

$$\text{IntersectCross}(A_1, A_2, j, k) = I_{j, n+k}(A_1^{(n)} \times A_2^{(m)})$$

$$A_1^{(n)} \bigcap_{j,k} A_2^{(m)} = \overline{\mathcal{P}}_{n+k}(\text{IntersectCross}(A_1, A_2, j, k))$$

It will be appreciated by those skilled in the art that the complementary projection, $\overline{\mathcal{P}}_{n+k}(\ )$, operation defined in section B.2 may be integrated into the first embodiment in order to avoid an additional pass. However, it is kept separate from IntersectCross( ) because IntersectCross( ) may serve also as a building block of another operation where the complementary projection operation must be postponed (e.g., multi-tape intersection).

The second embodiment simulates the behavior of an epsilon-filter transducer for composing transducers with epsilon-transitions that is disclosed by Mohri, Pereira, and Riley in "A rational design for a weighted finite-state transducers", published in Lecture Notes in Computer Science, 1436:144-158, 1998, which is incorporated herein by reference and hereinafter referred to as "Mohri's Epsilon-Filter Publication". The second embodiment is referred to herein as IntersectCrossEps ($A_1, A_2, j, k$), where the suffix "Eps" expresses its suitability for WMTAs with epsilons on the intersected tapes, j and k.

Similar to the first embodiment, it will be appreciated by those skilled in the art that the complementary projection, $\overline{P}_{n+k}( )$, operation defined in section B.2 may be integrated into the second embodiment in order to avoid an additional pass. However, it is kept separate from IntersectCrossEps( ) because IntersectCrossEps( ) may serve also as a building block of other operations where the complementary projection operation must be postponed or extended (e.g., classical composition and multi-tape intersection).

C.3.1 Conditions

Both embodiments for performing the single-tape intersection operation operate under the conditions that:

(A) the semirings of the two automata $A_1^{(n_1)}$ and $A_2^{(n_2)}$ equal to: $\mathcal{K}_1 = \mathcal{K}_2$;

(B) the common semiring $\mathcal{K} = \mathcal{K}_1 = \mathcal{K}_2$ is commutative:

$$\forall w_1, w_2 \in \mathcal{K}: w_1 \otimes w_2 = w_2 \otimes w_1;$$

(C) For IntersectCross( ): Neither of the two intersected tapes contains $\epsilon$:

$$(\neg \exists e_1 \in E_1: l_j(e_1) = \epsilon) \wedge (\neg \exists e_2 \in E_2: l_k(e_2) = \epsilon).$$

C.3.2 First Embodiment

FIG. 13 sets forth a method in pseudocode of the first embodiment for performing the single-tape intersection operation (i.e., A=IntersectCross($A_1, A_2, j, k$)). Line 1 begins with a WMTA A whose semiring equals those of $A_1$ and $A_2$ and that is otherwise empty. At lines 3 and 12-18, the initial state i of the WMTA A is created from the initial states $A_1$ and $A_2$ and pushed onto the stack initialized at line 2. While the stack is not empty, the states q are popped from it and the states $q_1$ and $q_2$ are accessed that are assigned to q through µ[q] at lines 4 and 5.

At lines 6 and 7, each outgoing transition $e_1$ of $q_1$ is intersected with outgoing transitions $e_2$ of $q_2$. This succeeds at line 8 only if the j-th labeled component of $e_1$ equals the k-th labeled component of $e_2$, where j and k are the two intersected tapes of $A_1$ and $A_2$, respectively. Only if it succeeds at line 8 will a transition be created at line 10 for A whose label results from pairing $l(e_1)$ with $l(e_2)$ and whose target q' corresponds with the pair of targets ($n(e_1), n(e_2)$). If q' does not exist yet, it is created and pushed onto the stack at lines 9 and 12-18.

It will be appreciated by those skilled in the art that this embodiment may be readily adapted to operate with non-weighted multi-tape automata (MTAs) by removing the weights from line 10 and the semiring $\mathcal{K}_1$ from line 1, and by replacing line 15 with "Final(q)←Final($q_1$)^Final($q_2$)" in the pseudocode shown in FIG. 13.

C.3.3 Mohri's Epsilon-Filter

The second embodiment for performing the single-tape intersection operation makes use of an epsilon-filter transducer similar to its use in the composition of two transducers with an epsilon-transition that is described in by Mohri et al. in Mohri's Epsilon-Filter Publication. This section describes the use of Mohri's epsilon-filter by simulating its use.

Figure 14:
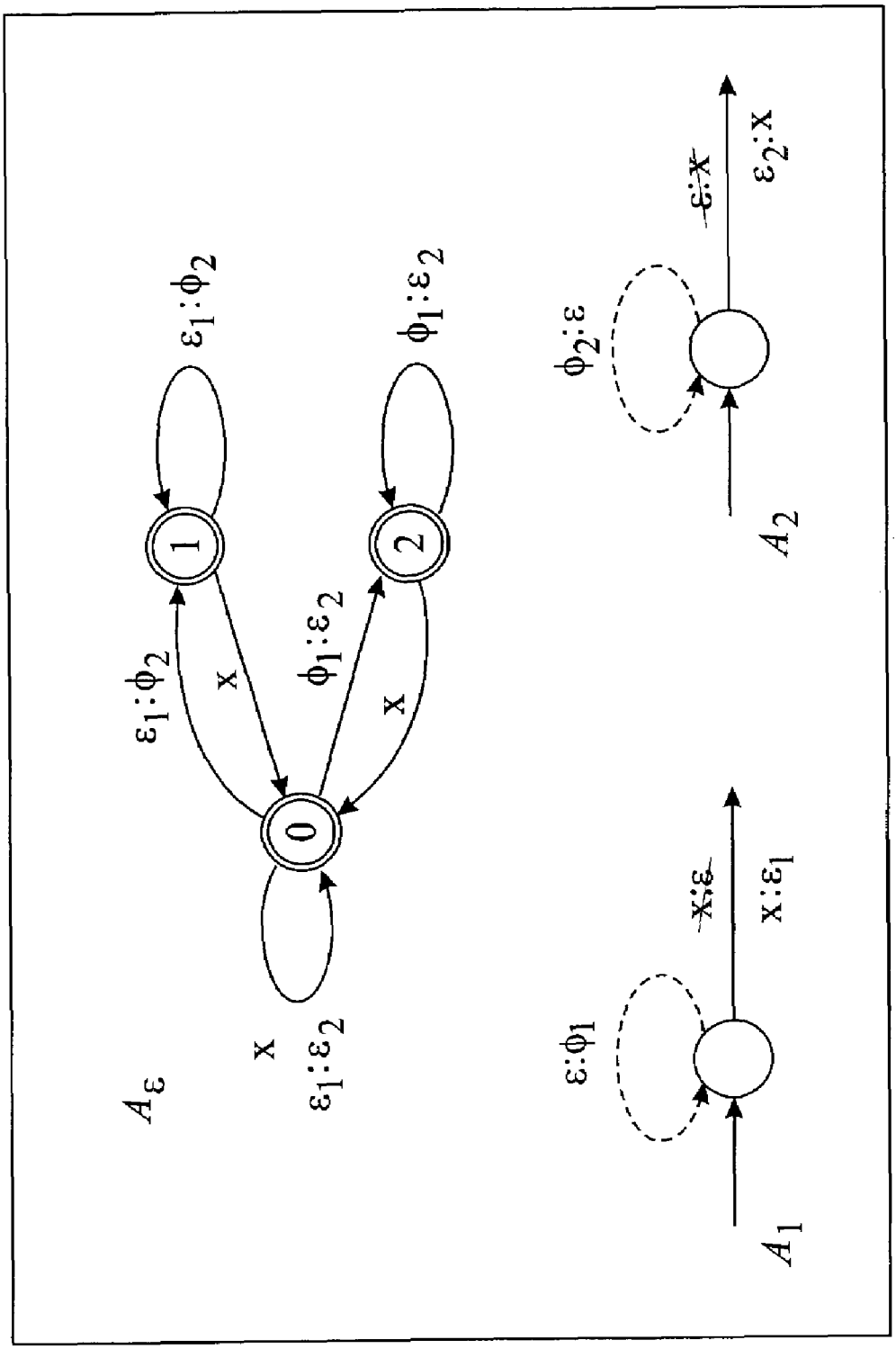
FIG. 14 presents Mohri's epsilon-filter $A_\epsilon$ and two automata $A_1$ and $A_2$.

FIG. 14 illustrates Mohri's epsilon-filter $A_\epsilon$ and two transducers $A_1$ and $A_2$. The transducers $A_1$ and $A_2$ are pre-processed for filtered composition (where $x = \neg\{\phi_1, \phi_2, \epsilon_1, \epsilon_2\}$) and each $\epsilon$ in tape 2 of $A_1^{(2)}$ is replaced by an $\epsilon_1$ and each $\epsilon$ in tape 1 of $A_2^{(2)}$ by an $\epsilon_2$. In addition, a looping transition labeled with $\epsilon:\phi_1$ is added to each state of $A_1^{(2)}$, and a loop labeled with $\phi_2:\epsilon$ to each state of $A_2^{(2)}$. The pre-processed transducers are then composed with the filter $A_E^{(2)}$ in between: $A_1 \Diamond A_\epsilon \Diamond A_2$. The filter controls how epsilon-transitions are composed along each pair of paths in $A_1$ and $A_2$, respectively. As long as there are equal symbols ($\epsilon$ or not) on the two paths, they are composed with each other, and the state does not change in $A_\epsilon$ from state zero. If a sequence of $\epsilon$ in $A_1$ but not in $A_2$ is encountered, the state advances in $A_1$, and the state does not change in $A_2$ from the state shown and in $A_\epsilon$ from state 1. If a sequence of $\epsilon$ in $A_2$ but not in $A_1$ is encountered, the state advances in $A_2$, and the state does not change in $A_1$ from the state shown and in $A_\epsilon$ from state 2.

C.3.4 Second Embodiment

FIG. 15 sets forth a method in pseudocode of the second embodiment for performing the single-ape intersection operation (i.e., A=IntersectCrossEps($A_1, A_2, j, k$)). Unlike the embodiment set forth in section C.3.2 which builds the cross-product, $A_1 \times A_2$, and then deletes some of its paths by auto intersection, $I_{j,n+k}( )$, this embodiment simulates the behavior of Mohri's epsilon-filter transducer described in section C.3.3 without Mohri's epsilon-filter transducer being present by adding an attribute at each state of the resulting WMTA A, thereby allowing only the useful parts of the cross-product to be constructed.

More specifically, in FIG. 15, line 1 begins with a WMTA A whose alphabet is the union of the alphabets of transducers $A_1$ and $A_2$, whose semiring equals those of $A_1$ and $A_2$, and that is otherwise empty. At lines 3 and 20-26, the initial state i of A is created from the states of $A_1$, $A_2$, and $A_\epsilon$, and the initial state i is pushed onto the stack initialized at line 2. While the stack is not empty, states q are popped from it and the states $q_1, q_2$, and $q_\epsilon$ that are assigned to states q through $\vartheta[q]$ at lines 4-5.

At lines 6-7, each outgoing transition $e_1$ of state $q_1$ is intersected with each outgoing transition $e_2$ of state $q_2$. This succeeds at line 8 only if the j-th labeled component of $e_1$ equals the k-th labeled component of $e_2$, where j and k are the two intersected tapes of $A_1$ and $A_2$, respectively, and if the corresponding transition in $A_\epsilon$ has target zero. Only if it succeeds at line 8 then at line 10, a transition in A is created (from the current source state) whose label results from pairing $l(e_1)$ with $l(e_2)$ and whose target state q' corresponds with the triple of targets ($n(e_1), n(e_2), 0$). If state q' does not exist yet, it is created and pushed onto the stack at lines 20-26.

Subsequently, all epsilon-transitions are handled in $A_1$ at lines 11-14 and in $A_2$ at lines 15-18. If an epsilon is encountered in $A_1$ and the automaton $A_\epsilon$ is in state 0 or in state 1, the current state advances in $A_1$; does not change in $A_2$, and advances to state 1 in $A_\epsilon$. At lines 11-14, a transition in A is therefore created whose target corresponds to the triple ($n(e_1), q_2, 1$). Corresponding actions take place at lines 15-18 if an epsilon is encountered in $A_2$.

It will be appreciated by those skilled in the art that this embodiment may be readily adapted to operate with non-weighted multi-tape automata (MTAs) by removing the weights from lines 10, 14, and 18 and the semiring $\mathcal{K}_1$ from line 1, and by replacing line 23 with "Final(q)←Final($q_1$) ^Final($q_2$)" in the pseudocode shown in FIG. 15.

It will further be appreciated by those skilled in the art that the embodiment shown in FIG. 15 for performing single-tape intersection of transducers $A_1$ and $A_2$ may be readily adapted to permit the composition of a first tape of the automata $A_1$ and a second tape of the automata $A_2$ while retaining one of the first and the second tapes and all other tapes of both transducers at the transitions where the tapes intersect by revising the labels at each transition E created at lines 10, 14, and 18 to remove one component (i.e., removing either the first tape or the second tape to eliminate redundant paths through complementary projection).

In addition it will be appreciated by those skilled in the art that the embodiment set forth in FIG. 15 may be readily adapted to perform a classical-composition operation where both the first tape of the automata $A_1$ and the second tape of the automata $A_2$ are removed while retaining all other tapes of both transducers at the transitions where the tapes intersect by revising the labels at each transition E created at lines 10, 14, and 18 to remove both components (i.e., removing both the first tape and the second tape).

C.3.5 Complexity

The worst-case complexity of both the first embodiment and the second embodiment for carrying out the a single-tape intersection is $|E_1| \cdot |E_2|$ in space and runtime (i.e., on the order of $O(n^2)$). The complexity of the second embodiment is only linearly greater than that of the first, which may be significant for large WMTAs.

C.4 Multi-Tape Intersection

This section sets forth two embodiments for performing the multi-tape intersection operation of two WMTAs $A_1^{(n)}$ and $A_2^{(m)}$ defined in section B.6. The first embodiment is referred to herein as Intersect1($A_1^{(n)}$ and $A_2^{(m)}$, $j_1 \ldots j_r$, $k_1 \ldots k_r$), follows the definition of multi-tape intersection while performing operations for cross-product, auto-intersection, and complementary projection. The second embodiment, which is more efficient, is referred to herein as Intersect2($A_1^{(n)}$ and $A_2^{(m)}$, $j_1 \ldots j_r$, $k_1 \ldots k_r$), makes use of methods that perform cross-product and auto-intersection in one step (for intersection tape $j_1$ and $k_1$), and then the auto-intersection (for any intersecting tapes $j_i$ with $k_i$, for $i>1$).

C.4.1 Conditions

Both embodiments for performing the multi-tape intersection operation under the conditions that:

(a) the semirings of the two automata $A_1^n$ and $A_2^{(m)}$ are equal to: $\mathcal{K}_1 = \mathcal{K}_2$; and (b) the common semiring $\mathcal{K} = \mathcal{K}_1 = \mathcal{K}_2$ is commutative:

$$\forall w_1, w_2 \in \mathcal{K} : w_1 \otimes w_2 = w_2 \otimes w_1$$

(c) $A_1^{(n)}$ and $A_2^{(m)}$ have no cycles exclusively labeled with epsilon on any of the intersected tapes:

$j_i \in [1, n]$ and $k_i \in [1, m]$, for $i \in [1, r]$.

C.4.2 Embodiments

The first embodiment, Intersect1( ), for carrying out the multi-tape intersection operation defined in section B.6 may be expressed in pseudocode as follows:

(a) in one embodiment, while referring at line 1 to CrossPA( ) (to perform a cross production operation on the WMTAs $A_1^{(n)}$ and $A_2^{(m)}$) set forth in FIG. 5, at line 3 to the first AutoIntersect( ) method (to perform the auto-intersection operation for each intersecting tapes $j_i$ and $k_i$) set forth in FIG. 6, and at line 4 to complementary projection $\overline{P}$(to eliminate redundant tapes) described in section B.2:

---

INTERSECT1($A_1^{(n)}, A_2^{(m)}, j_1 \ldots j_r, k_1 \ldots k_r$) → A :

1  A ← CROSSPA($A_1^{(n)}, A_2^{(m)}$)
2  for $\forall i \in [[1, r]]$ do
3     A ← AUTOINTERSECT(A, $j_i$, n+$k_i$)
4  A ← $\overline{P}_{n+k_1,\ldots,n+k_r}$(A)
5  return A

--- or (b) in another embodiment, while referring at line 1 to CrossPA( ) (to perform a cross product operation on the WMTAs $A_1^{(n)}$ and $A_2^{(m)}$ set forth in FIG. 5, at line 4 to the second AutoIntersect( ) method (to perform the auto-intersection operation for each intersecting tapes $j_i$ and $k_i$) set forth in FIG. 9, and at line 6 to complementary projection $\overline{P}$(to eliminate redundant tapes) described in section B.2:

---

INTERSECT1($A_1^{(n)}, A_2^{(m)}, j_1 \ldots j_r, k_1 \ldots k_r$) → (A, boolean) :

1  A ← CROSSPA ($A_1^{(n)}, A_2^{(m)}$)
2  regular ← true
3  for $\forall i \in [[1, r]]$ do
4     (A, reg) ← AUTOINTERSECT(A, $j_i$, n+$k_i$)
5     regular ← regular ∩ reg
6  A ← $\overline{P}_{n+k_1,\ldots,n+k_r}$(A)
7  return (A, regular)

---

The second embodiment, Intersect2( ), for carrying out the multi-tape intersection operation defined in section B.6 may be expressed in pseudocode as follows:

(a) in one embodiment, while referring at line 1 to IntersectCrossEps( ) set forth in FIG. 15 (to perform the single-tape intersection operation on one pair of tapes, for tapes $j_1$ with $k_1$ on the WMTAs $A_1^{(n)}$ and $A_2^{(m)}$), at line 3 to AutoIntersect( ) set forth in FIG. 6 (to perform the auto-intersection operation for any intersecting tapes $j_i$ with $k_i$, for $i>1$), and at line 4 to complementary projection $\overline{P}$(to eliminate redundant tapes) described in section B.2:

---

INTERSECT2($A_1^{(n)}, A_2^{(m)}, j_1 \ldots j_r, k_1 \ldots k_r$) → A :

1  A ← INTERSECTCROSSEPS($A_1^{(n)}, A_2^{(m)}, j_1, k_1$)
2  for $\forall i \in [[2, r]]$ do
3     A ← AUTOINTERSECT(A, $j_i$, n+$k_i$)
4  A ← $\overline{P}_{n+k_1,\ldots,n+k_r}$(A)
5  return A

--- or (b) in another embodiment, while referring at line 1 to IntersectCrossEps( ) set forth in FIG. 15 (to perform the single-tape intersection operation on one pair of tapes $j_{i=1}$ with $k_{i=1}$ on the WMTAs $A_1^{(n)}$ and $A_2^{(m)}$, at line 4 to AutoIntersect( ) set forth in FIG. 9 (to perform the auto-intersection operation for any intersecting tapes $j_i$ with $k_i$, for $i>1$), and at line 6 to complementary projection $\overline{P}$(to eliminate redundant tapes) described in section B.2:

---

INTERSECT2($A_1^{(n)}, A_2^{(m)}, j_1 \ldots j_r, k_1 \ldots k_r$) → (A, boolean) :

1  A ← INTERSECTCROSSEPS($A_1^{(n)}, A_2^{(m)}, j_1, k_1$)
2  regular ← true
3  for $\forall i \in [[2, r]]$ do -continued

```
INTERSECT2(A₁⁽ⁿ⁾, A₂⁽ᵐ⁾,j₁ ... jᵣ, k₁ ... kᵣ) → (A, boolean) :
   4      (A, reg) ← AUTOINTERSECT(A, jᵢ, n+kᵢ)
   5      regular ← regular ∧ reg
   6      A ← P̄_{n+k₁,...,n+kᵣ}(A)
   7      return (A, regular)
```

C.4.3 Example

By way of example, a solution is presented for compiling a multi-tape intersection of the MTA $A_1^{(2)}$ and the MTA $A_2^{(2)}$ in accordance with the last method presented immediately above to produce the regular MTA $A^{(2)}$ as follows:

$$A^{(2)} = A_1^{(2)} \bigcap_{\substack{1,1\\2,2}} A_2^{(2)} = \mathcal{P}_{3,4}(\mathcal{I}_{2,4}(\mathcal{I}_{1,3}(A_1^{(2)} \times A_2^{(2)}))) \text{ where }$$

$$A_1^{(2)} \bigcap_{\substack{1,1\\2,2}} A_2^{(2)}$$

is given by:

$$\begin{pmatrix} a & b \\ \varepsilon & A \end{pmatrix} \begin{pmatrix} c & a & b \\ B & \varepsilon & C \end{pmatrix}^* \begin{pmatrix} \varepsilon & \varepsilon & \varepsilon & c & \varepsilon \\ A & B & C & \varepsilon & A \end{pmatrix} \bigcap_{\substack{1,1\\2,2}} \begin{pmatrix} \varepsilon \\ A \end{pmatrix} \begin{pmatrix} a & b & \varepsilon & c \\ B & \varepsilon & C & A \end{pmatrix}^*$$

where the preceding each row of the matrix-like representation sets forth a tape of each WMTA (e.g., $A_1^2$=(a, ε)(b, A)(⟨c, B⟩)(a, ε)(b, C⟩)*(ε, A)(ε, B)(ε, C)(c, ε)(ε, A⟩).

In accordance with the method set forth above, the multi-tape intersection operation is performed in three steps. First, the following automaton $B_1^{(4)}=I_{1,3}(A_1^{(2)} \times A_2^{(2)})$ is computed using single-tape intersection at line 1 (i.e., Intersect-CrossEps( ) shown in FIG. 15) to obtain:

$$\begin{pmatrix} \varepsilon & a & b \\ \varepsilon & \varepsilon & A \\ \varepsilon & a & b \\ A & B & \varepsilon \end{pmatrix} \begin{pmatrix} \varepsilon & c & a & b \\ \varepsilon & B & \varepsilon & C \\ \varepsilon & c & a & b \\ C & A & B & \varepsilon \end{pmatrix}^* \begin{pmatrix} \varepsilon & \varepsilon & \varepsilon & c & \varepsilon \\ A & B & C & \varepsilon & A \\ \varepsilon & \varepsilon & \varepsilon & c & \varepsilon \\ C & \varepsilon & \varepsilon & A & \varepsilon \end{pmatrix}$$

Next, the following automaton $B_2^{(4)}=I_{2,4}(B_1^{(4)})$ is computed using auto-intersection at line 4 (i.e., AutoIntersect( ) shown in FIG. 9) to obtain:

$$\begin{pmatrix} \varepsilon & a & b \\ \varepsilon & \varepsilon & A \\ \varepsilon & a & b \\ A & B & \varepsilon \end{pmatrix} \begin{pmatrix} \varepsilon & c & a & b \\ \varepsilon & B & \varepsilon & C \\ \varepsilon & c & a & b \\ C & A & B & \varepsilon \end{pmatrix}^1 \begin{pmatrix} \varepsilon & \varepsilon & \varepsilon & c & \varepsilon \\ A & B & C & \varepsilon & A \\ \varepsilon & \varepsilon & \varepsilon & c & \varepsilon \\ C & \varepsilon & \varepsilon & A & \varepsilon \end{pmatrix}$$

Finally, the following automaton $A^2 = \bar{P}_{3,4}(B_2^{(4)})$ is computed using complementary projection $\bar{P}$ at line 6 (described in section B.2) to obtain:

$$\begin{pmatrix} \varepsilon & a & b \\ \varepsilon & \varepsilon & A \end{pmatrix} \begin{pmatrix} \varepsilon & c & a & b \\ \varepsilon & B & \varepsilon & C \end{pmatrix}^1 \begin{pmatrix} \varepsilon & \varepsilon & \varepsilon & c & \varepsilon \\ A & B & C & \varepsilon & A \end{pmatrix}$$

D. Applications

This section describes different applications for using the operations on WMATs that are described herein.

D.1 General Use

Figures 16, 17, 18, 19:
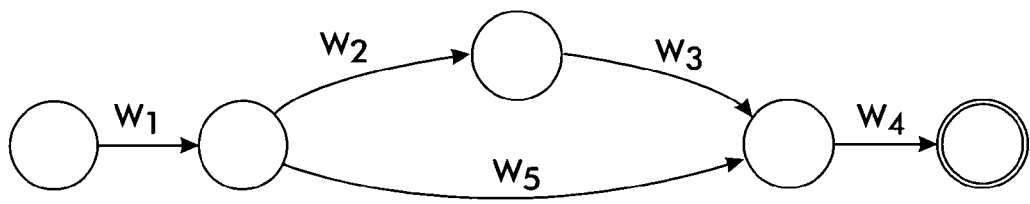
FIG. 16 presents an automaton for illustrating an operation for part-of-speech (POS) disambiguation and its use in natural language processing.
FIG. 17 illustrates one path of the automaton shown in FIG. 16.
FIG. 18 illustrates the intersection of an arc with a path of a lexicon automaton.
FIG. 19 illustrates the intersection of a path of a sentence automaton with a path of an HMM automaton.

FIG. 16 sets forth an automaton $W^{(1)}$ for illustrating a proposed operation for part-of-speech (POS) disambiguation and how it may be used in natural language processing (NLP). The automaton $W^{(1)}$ shown in FIG. 16 is an automaton that represents a natural-language sentence, with one word w on each transition. In general, such an automaton can contain one or several paths, according to whether the sentence was unambiguously tokenized or not. In the example shown in FIG. 16, the automaton $W^{(1)}$ contains two paths, corresponding to an ambiguous tokenization into either three or four words. FIG. 17 illustrates the process for one path $\pi_i(W)$ (which occurs similarly for all paths) of the automaton $W^{(1)}$.

Table 2 sets forth resources that may be used in this example, which are encoded as WMTAs.

TABLE 2

| Automaton | Type Of Resource | Tapes |
|---|---|---|
| $N^{(2)}$ | normalizer | original word form, normalized form |
| $L^{(3)}$ | morphological lexicon | surface form, lemma, POS-tag |
| $H^{(1)}$ | Hidden Markov Model | POS-tag sequence |

This example can be expressed in pseudocode as follows:

```
1    for ∀ e ∈ E(W) do
2        𝒜(e)⁽¹⁾ ← 𝒫₂(𝒜(e)⁽¹⁾ ∩_{1,1} N⁽²⁾)
3        𝒜(e)⁽³⁾ ← 𝒜(e)⁽¹⁾ ∩_{1,1} L⁽³⁾
4        if 𝒜(e)⁽³⁾ = ⊥
5            then 𝒜(e) ← ...
6    W⁽⁴⁾ ← W⁽⁴⁾ ∩_{3,1} H⁽¹⁾
7    W⁽⁴⁾ ← bestPath(W⁽⁴⁾)
```

At line 1 of the pseudocode above, each transition of 1-tape automaton $W^{(1)}$ (i.e., each word of the sentence) is processed separately: 𝒜(e), representing the transition e∈E(W), is intersected with a normalizer $N^{(2)}$ and only the second tape of the result is retained at line 2. Subsequently, 𝒜(e) is intersected with a 3-tape morphological lexicon $\mathcal{L}^{(3)}$ and becomes itself 3-tape as set forth in line 3 of the pseudocode and in FIG. 18. Specifically, FIG. 18 illustrates the intersection of an arc e of $W^{(1)}$ with a path $\pi^{(3)}$ of the lexicon automaton $\mathcal{L}^{(3)}$. If at line 4 this operation fails, then something else is done with 𝒜(e) at line 5 such as intersecting 𝒜(e) with another n-tape automaton.

When all transitions have been separately processed, as described above, processing begins again on the sentence automaton $W^{(4)}$, which at this point has four tapes due to previous operations. At line 6, the sentence automaton $W^{(4)}$ is intersected with a 1-tape automaton $H^{(1)}$ that represents an HMM as shown in FIG. 19. More specifically, FIG. 19 illustrates the intersection of a path $\pi_j^{(4)}$ of the sentence automaton W$^{(4)}$ with a path $\pi^{(1)}$ of the HMM automaton H$^{(1)}$. Finally at line 7, only the best path of the sentence automaton W$^{(4)}$ is retained.

D.2 Building a Lexicon from a Corpus

Using basic software programming utilities such as those forming part of UNIX, a list of inflected words with their POS-tags and their frequencies from an annotated corpus may be generated and stored in a file. Such a file may for example contain entries as shown in Table 3.

TABLE 3

| Inflected Word | POS-tag | Fequency |
|---|---|---|
| leave | NN | 7 |
| leave | VB | 154 |
| leaves | NNS | 18 |
| leaves | VBZ | 25 |
| leaving | VBG | 67 |
| left | JJ | 47 |
| left | VBD | 118 |
| left | VBN | 147 |

In one implementation, a WMTA lexicon may be created over the semiring <$\overline{\mathbb{R}}^+$, +, x, 0, 1>, where each line of a file (as illustrated in Table 3) becomes the n-tape label of a path, such that each token of the line (or each column of Table 3) is placed onto a different tape, except for the last token (i.e., the frequency) which becomes the weight of the path. Using such an implementation and the example data in Table 3, a 2-tape corpus lexicon C$^{(2)}$ may be constructed with paths having the labels l$^{(2)}$ and the weights w as shown in Table 4.

TABLE 4

| Label l$^{(2)}$ | Weight w |
|---|---|
| <leave, NN> | 7 |
| <leave, VB> | 154 |
| <leaves, NNS> | 18 |
| <leaves, VBZ> | 25 |
| <leaving, VBG> | 67 |
| <left, JJ> | 47 |
| <left, VBD> | 118 |
| <left, VBN> | 147 |

D.3 Enhancing a Lexicon with Lemmas

The corpus of lexicons and lemmas defined in section D.2 may be enhanced using another lexicon encoded as a non-weighted MTA, 743) having entries of the form T$^{(3)}$ <InflectedWord, Lemma, PosTag>, and containing at least those entries in Table 5.

TABLE 5

| Inflected Word | Lemma | PosTag |
|---|---|---|
| leave | leave | NN |
| leave | leave | VB |
| leaves | leaf | NNS |
| leaves | leave | NNS |
| leaves | leave | VBZ |
| leaving | leave | VBG |
| left | left | JJ |
| left | leave | VBD |
| left | leave | VBN |

Each of the entries in Table 5 is uniformly weighted with w=1.0 by assigning 1.0 to each transition and final state. To distribute the probability among different lemmas for equal inflected forms and POS tags, the lexicon T$^{(3)}$ is normalized with respect to tape 1 and tape 3 using multi-tape intersection resulting in the entries shown in Table 6.

TABLE 6

| Lexicon T$^{(3)}$ | Weight w |
|---|---|
| <leave, leave, NN> | 1.0 |
| <leave, leave, VB> | 1.0 |
| <leaves, leaf, NNS> | 0.5 |
| <leaves, leave, NNS> | 0.5 |
| <leaves, leave, VBZ> | 1.0 |
| <leaving, leave, VBG> | 1.0 |
| <left, left, JJ> | 1.0 |
| <left, leave, VBD> | 1.0 |
| <left, leave, VBN> | 1.0 |

The intersection of the lexicon T$^{(3)}$ (having values shown in column 1 of Table 6) with the corpus lexicon C$^{(2)}$ (having values shown in Table 4) on the tapes of inflected forms and POS-tags, respectively, is defined as:

$$L^{(3)} = T^{(3)} \underset{3,2}{\cap_{1,1}} C^{(2)}$$

and results in the lexicon L$^{(3)}$ the entries of which are shown in Table 7.

TABLE 7

| Lexicon L$^{(3)}$ | Weight w |
|---|---|
| <leave, leave, NN> | 7 |
| <leave, leave, VB> | 154 |
| <leaves, leaf, NNS> | 9 |
| <leaves, leave, NNS> | 9 |
| <leaves, leave, VBZ> | 25 |
| <leaving, leave, VBG> | 67 |
| <left, left, JJ> | 47 |
| <left, leave, VBD> | 118 |
| <left, leave, VBN> | 147 |

Finally, the lexicon L$^{(3)}$ (having values shown in Table 7) is normalized (i.e., all entries with the same inflected form have a weight w that sums to one) with respect to inflected forms to provide the entries shown in Table 8.

TABLE 8

| Lexicon L$^{(3)}$ | Weight w |
|---|---|
| <leave, leave, NN> | 0.043 |
| <leave, leave, VB> | 0.957 |
| <leaves, leaf, NNS> | 0.209 |
| <leaves, leave, NNS> | 0.209 |
| <leaves, leave, VBZ> | 0.581 |
| <leaving, leave, VBG> | 1.000 |
| <left, left, JJ> | 0.151 |
| <left, leave, VBD> | 0.378 |
| <left, leave, VBN> | 0.471 |

D.4 Normalizing a Lexicon

In this example, the conditional normalization of a WMTA, A$_1^{n+m}$, is compiled over the semiring <$\overline{\mathbb{R}}^+$, +, x, 0, 1>, with respect to some of its tapes, using a generalization of the method proposed by Eisner in "Parameter Estimation For Probabilistic Finite-state Transducers", in Proceedings of the 40th Annual Meeting, pages 1-8, Philadelphia, Pa., USA, Association For Computer Linguistics, 2002, which is incorporated herein by reference. Consider, for instance, each string tuple $u^{(n+m)}$ in the language $L_1^{(n+m)}$ of $A_1^{(n+m)}$ to be a pair of string tuples (i.e., $u^{(n+m)} = s^{(n)} : v^{(m)}$). Normalizing $A_1^{(n+m)}$ conditionally with respect to n+1 to n+m means compiling for each $u^{(n+m)}$ the probability of $s^{(n)}$ in the context of $v^{(m)}$.

Suppose, originally the weight of each $u^{(n+m)}$ is its frequency (i.e., the frequency of concurrence of tuples $s^{(n)}$ and $v^{(m)}$) is given by:

$$w_{A_1}(u^{(n+m)}) = f(s^{(n)} v^{(m)})$$

The context tapes of $\mathcal{L}_1^{(n+m)}$ are projected and the following context language is obtained:

$$\mathcal{L}_c^{(m)} = \mathcal{P}_{n+1,\ldots,n+m}(\mathcal{L}_1^{(n+m)})$$

Each string tuple $v^{(m)} \in \mathcal{L}_c^{(m)}$ of the determinized context automaton $A_c^{(m)}$ has the weight given by:

$$w(v^{(m)}) = \bigoplus_{v_i^{(m)} = v^{(m)}} w_{A_1}(s_i^{(n)} : v_i^{(m)}) = f(v^{(m)})$$

The weight of all string tuples $v^{(m)} \in \mathcal{L}_c^{(m)}$ is inversed by inversing the weight of each transition and each final state of $A_c^{(m)}$. The resulting weight of each $v^{(m)}$ is given by:

$$w_{A_c}(v^{(m)}) = f(v^{(m)})^{-1}.$$

Finally, the original $A_1^{(n+m)}$ is intersected with $A_c^{(m)}$ on all context tapes, and an automaton $A_2^{(n+m)}$ obtained with the language given by:

$$\mathcal{L}_2^{(n+m)} = \mathcal{L}_1^{(n+m)} \bigcap_{\substack{n+1,1 \\ \ldots \\ n+m,m}} \mathcal{L}_c^{(m)}$$

All string tuples $u^{(n+m)} = s^{(n)} : v^{(m)} \in \mathcal{L}_2^{(n+m)}$ have the weight given by:

$$w_{A_2}(u^{(n+m)}) = w_{A_1}(s^{(n)} : v^{(m)}) \otimes w_{A_c}(v^{(m)})$$
$$= f(s^{(n)} : v^{(m)}) \cdot f(v^{(m)})^{-1}$$
$$= p(s^{(n)} | v^{(m)})$$

Those skilled in the art will appreciate that this approach does not require the context tapes to be consecutive.

To compile the joint normalization of a WMTA, $A_1^{(n)}$, over the semiring $\langle \overline{\mathbb{R}}^+, +, \times, 0, 1 \rangle$, the frequency of each string tuple $s(n) \in \mathcal{L}(A_1^{(n)})$ is multiplied with the inverse of the total frequency $f_T$ of all string tuples. The total frequency $f_T$ can be obtained by replacing the label of each transition of $A_1^{(n)}$ with $\in$ and applying an epsilon removal (as described for example by Mohri in "Generic epsilon-removal and input epsilon-normalization algorithms for weighted transducers", in International Journal of Foundations of Computer Science, 13(1): 129-143, 2002, which is incorporated herein by reference). The resulting automaton, $A_T$, has one single state, without any outgoing transitions, and a final weight that equals the total frequency, $\varrho = f_T$. The final weight $\varrho$ is inversed and $A_1^{(n)}$ is concatenated with $A_T$. All string tuples $s^{(n)} \in \mathcal{L}(A_2^{(n)})$ of the resulting automaton $A_2^{(n)} = A_1^{(n)} A_T$ have the weight given by:

$$w_{A_2}(s^{(n)}) = w_{A_1}(s^{(n)}) \otimes w_{A_T}(\varepsilon^{(n)})$$
$$= f(s^{(n)}) \cdot f_T^{-1}$$
$$= p(s^{(n)})$$

D. 5 Using a Lexicon

When using a lexicon WMTA, A(n), the following may be specified: r input tapes, $j_1$ to $j_r$, and x output tapes, $k_1$ to $k_x$, which do not have to be consecutive. A weighted r-tuple of input strings, $s^{(r)}$, may first be converted into an input WMTA, $I^{(r)}$, having one single path with the specified label, $s^{(r)}$, and weight, $w(s^{(r)})$. Subsequently to obtaining the output WMTA, $O^{(x)}$, whose language contains all weighted x-tuples of output strings, $v^{(x)}$, the following multi-tape intersection and projection may be used:

$$O^{(x)} = \mathcal{P}_{k_1,\ldots,k_x}\left(A^{(n)} \bigcap_{\substack{j_1,1 \\ \ldots \\ j_r,r}} I^{(r)}\right)$$

D.6 Searching for Similarities

In the applications described in this section, string tuples s(n) may searched for in the language $\mathcal{L}_1^{(n)}$ of a WMTA $A_1^{(n)}$ whose strings s to s are similar to its strings $s_{k_1}$ to $s_{k_r}$ respectively. The comparison of each pair of tapes, $j_i$ and $k_i$, may be done independently form all other pairs of tapes. Hence the task may be reduced to comparing two tapes, j and k.

First, a 2-tape automaton, $R^{(2)}$, may be created, whose language, $\mathcal{L}_R^{(2)}$, describes the requested relation between tape j and k of $\mathcal{L}_1^{(n)}$. To obtain the language given by the relation:

$$\mathcal{L}_2^{(n)} \subseteq \mathcal{L}_1^{(n)}$$

and where when this relation holds between the languages, the following language may be compiled:

$$\mathcal{L}_2^{(n)} = \mathcal{L}_1^{(n)} \bigcap_{\substack{j,1 \\ k,2}} R^{(2)}$$

In one specific example, suppose there exists an English-German dictionary that is encoded as a 3-tape WMTA, with each entry being of the form <English, German, PosTag>. To find all words that are similar in the two languages, while having the same POS tag, a 2-tape automaton, $R^{(2)}$, may be created that describes this similarity by using, for example, either of the approaches referred to herein as the "Levenshtein Distance" or the "List of Grapheme Correspondences" described below.

The Levenshtein Distance between two strings is the minimal number of intersections, deletions or substitutions of symbols that are needed to transform one string into the other, as disclosed by Schulz and Mihov in "Fast string correction with Levenshtein automata", International Journal on Document Analysis and Recognition, 5(1):67-85, 2002, which is incorporated herein by reference. A WMTA, $Lv_d^{(2)}$, having a Levenshtein Distance d between the members $s_1$ and $s_2$ of all string tuples $s^{(2)} \in \mathcal{L}(Lv_d^{(2)})$ can be compiled from the regular expression:

$$Lv_d^{(2)} = ((?:,?)^*(?:?\cup?:\in\in:?)(?:,?)^*)^d,$$

where ? means any symbol (i.e., ?∈{a, b, c, . . . }), and $:_i$ is an identity paring such that $(?:_i?) \in \{a:a, b:b, c:c, \ldots\}$, whereas $(?:?) \in \{a:a, a:b, b:a, \ldots\}$.

The List of Grapheme Correspondences by manually writing a list of synchronic grapheme correspondences resulting from historical phonological alterations in the English and German languages may, for example, contain the entries in Table 9 (for English in column 1 and German in column 2).

TABLE 9

| ENGLISH | GERMAN |
|---------|--------|
| th | d |
| th | ss |
| d | t |

Using the lexicon construction method described in sections D.2-D.5, the list of entries in Table 9 may be used to construct a lexicon-like automaton, $Ch^{(2)}$, that encodes these changes in the form set forth in Table 10 (where column 1 identifies the lexicon, and column 2 identifies the weight).

TABLE 10

| Lexicon $Ch^{(2)}$ | Weight w |
|--------------------|----------|
| <th, d> | 1 |
| <th, ss> | 1 |
| <d, t> | 1 |

The lexicon-like automaton $Ch^{(2)}$ may then be used to obtain a WMTA, $R^{(2)}$, whose language describes the relation between any English word and its potential German form that is given by:

$$R^{(2)} = (Ch^{(2)} \cup ?:_i?)^+.$$

D.7 Preserving Intermediate Transduction Results

Figure 20:
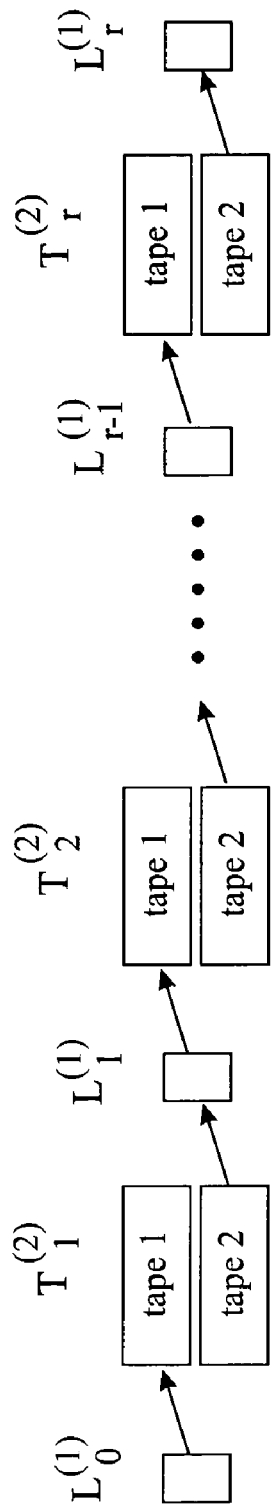
FIG. 20 illustrates an example of a (classical) weighted transduction cascade.
Figure 21:
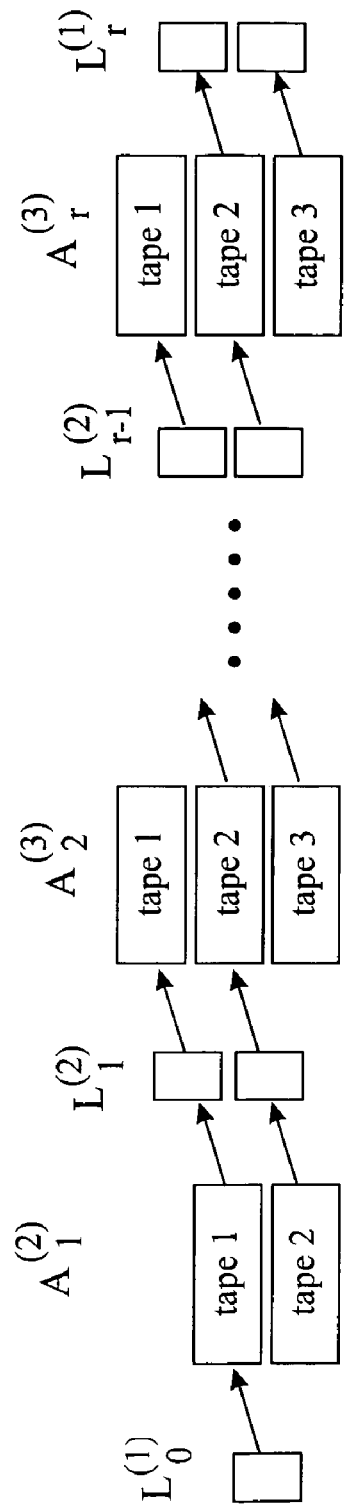
FIG. 21 illustrates an example of a weighted transduction cascade using multi-tape intersection.

In this section, the advantage of WMTAs through transduction cascades, which are frequently used in language and speech processing, is illustrated. In a (classical) weighted transduction cascade, $T_1^{(2)} \ldots T_r^{(2)}$, a set of weighted strings, encoded as a weighted acceptor, $L_0^{(1)}$, is composed with the transducer, $T_1^{(2)}$, on its input tape as shown in FIG. 20. The output projection of this composition is the first intermediate result, $L_1^{(1)}$, of the cascade. It is further composed with the second transducer, $T_2^{(2)}$, which leads to the second intermediate result, $L_2^{(1)}$, etc. The projection of the last transducer is the final result, $L_r^{(1)}$, which is defined as follows:

$$L_i^{(1)} = \mathcal{P}_2(L_{i-1}^{(1)} \diamond T_i^{(2)}) \text{ for } i \in [\![1, r]\!]$$

At any point in this cascade, previous results cannot be accessed.

In a weighted transduction cascade, $A_1^{(n_1)} \ldots A_r^{(n_r)}$, that uses WMTAs and multi-tape intersection, intermediate results can be preserved and used by all subsequent transductions. For example, assuming the two previous results at each point in the cascade (except in the first transduction) are to be used in computing the results. This operation requires all intermediate results, $L_i^{(2)}$, to have two tapes as shown in FIG. 2 and defined as follows:

$$L_1^{(2)} = L_0^{(1)} \underset{1,1}{\cap} A_1^{(2)}$$

$$L_i^{(2)} = \mathcal{P}_{2,3}(L_{i-1}^{(2)} \underset{\substack{1,1 \\ 2,2}}{\cap} A_i^{(3)}) \text{ for } i \in [\![2, r-1]\!]$$

$$L_r^{(2)} = \mathcal{P}_3(L_{r-1}^{(2)} \underset{\substack{1,1 \\ 2,2}}{\cap} A_r^{(3)})$$

This augmented descriptive power is also available if the whole cascade is intersected into a single WMTA, $A^{(2)}$ (although $A^{(2)}$ has only two tapes in the example). Each of the "incorporated" multi-tape sub-relations in $A^{(2)}$ (except for the first one) will still refer to its two predecessors as follows:

$$A_{1 \ldots i}^{(3)} = \mathcal{P}_{1,n-1,n}(A_{1 \ldots i-1}^{(m)} \underset{\substack{n-1,1 \\ n,2}}{\cap} A_i^{(3)}) \text{ for } i \in [\![2, r]\!], m \in \{2, 3\}$$

$$A^{(2)} = \mathcal{P}_{1,n}(A_{1 \ldots r})$$

Advantageously, this example illustrates how intermediate results can be preserved in transduction cascades sot that they can be accessed by any of the following transductions.

D.8 Example System

Figure 22:
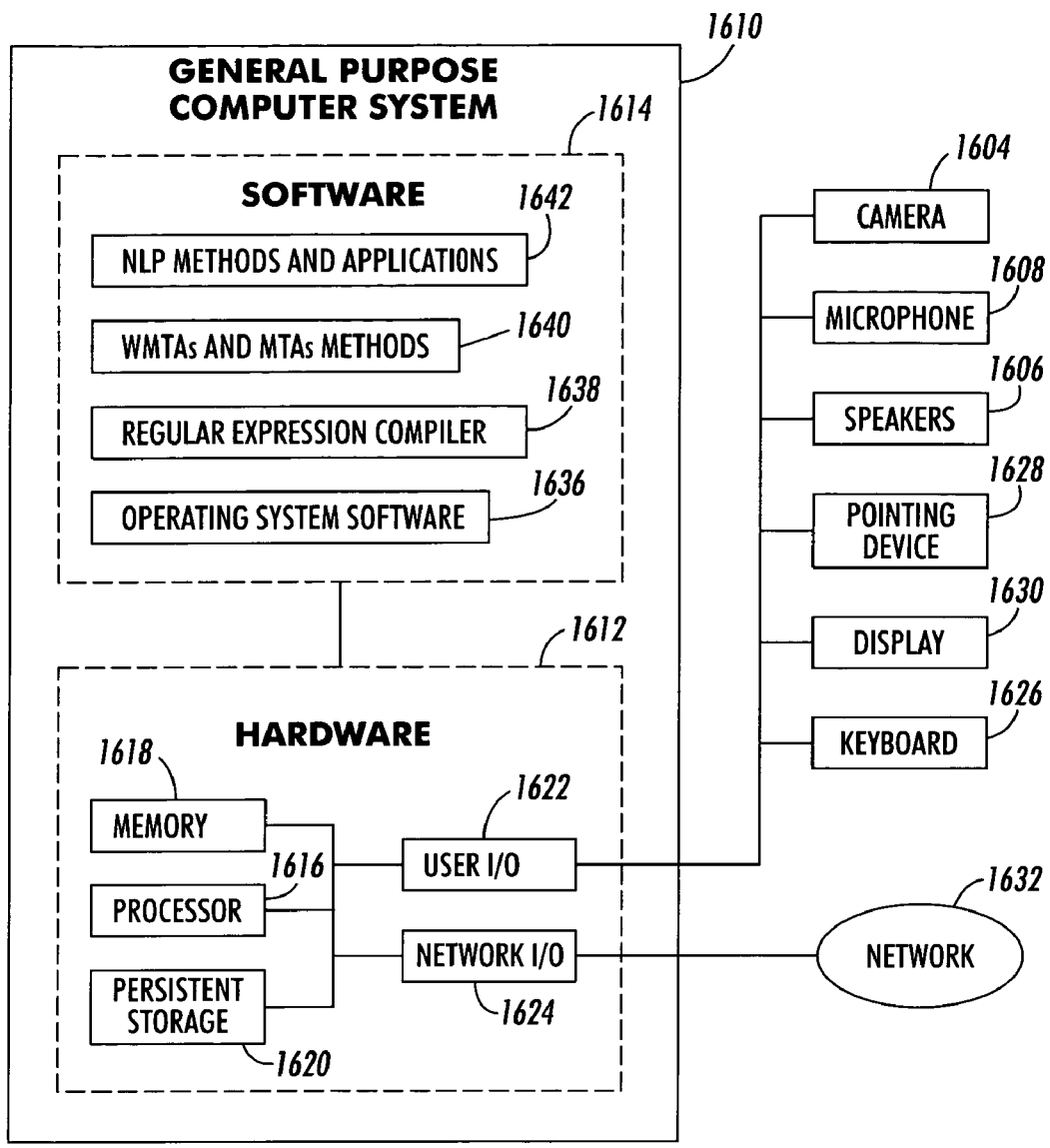
FIG. 22 illustrates a general purpose computer system for carrying out natural language processing in accordance with the present invention.

FIG. 22 illustrates a general purpose computer system 1610 for carrying out NLP in accordance with the present invention. The system 1610 includes hardware 1612 and software 1614. The hardware 1612 is made up of a processor (i.e., CPU) 1616, memory 1618 (ROM, RAM, etc.), persistent storage 1620 (e.g., CD-ROM, hard drive, floppy drive, tape drive, etc.), user I/O 1622, and network I/O 1624. The user I/O 1622 can include a keyboard 1626, a pointing device 1628 (e.g., pointing stick, mouse, etc.), microphone 1608, camera 1604, speakers 1606, and the display 1630. The network I/O 1624 may for example be coupled to a network 1632 such as the Internet. The software 1614 of the system 1610 includes an operating system 1636, a regular expression compiler 1638, a WMTAs and MTAs methods 1640 (e.g., auto-intersection and tape-intersection), and NLP methods and applications 1642. In one embodiment, the natural language processing methods and applications 1642 use WMTAs and MTAs that are stored in memory 1618 and that are compiled, for example, from regular expressions using compiler 1638, to perform one or more singly or in combination of POS tagging, tokenization, phonological and morphological analysis, disambiguation, spelling correction, translation, entity extraction, and shallow parsing.

E. Miscellaneous

Although the present invention is generally directed at weighted automata, each operation described in the forgoing specification may be used to operate on non-weighted automata as well. Additional background of the invention is described in the following publications incorporated herein by reference: Andre Kempe, Christof Baeijs, Tamas Gaal, Franck Guingne, Florent Nicart, "WFSC—A new weighted finite state compiler", 8th Int. Conf. on Implementation and Application of Automata (CIAA 03), Santa Barbara, Calif., USA, Jul. 16-18, 2003 (which describes an example framework for carrying out the weighted finite state operations set forth herein); and Andre Kempe, "NLP Applications based on weighted multi tape automata", TALN, Fes, Morocco, Apr. 19-22, 2004 (which describes an additional example related to section D.6 for extracting similar words in French and Spanish).

Advantageously over (weighted) 1-tape or 2-tape system for processing automata, the forgoing specification for processing n-tape automata permits: (a) the separation of different types of information used in NLP over different tapes (e.g., surface form, lemma, POS-tag, domain-specific information, etc.); (b) the preservation of some or all intermediate results of various NLP steps on different tapes; and (c) the possibility of defining and implementing contextual replace rules referring to different types of information on different tapes. Contextual replace rules are more fully described in the publications, which are incorporated herein by reference, by: Kaplan and Kay "Regular models of phonological rule systems", Computational Linguistics 20(3):331-378, 1994; Karttunen "The replace operator", Proceedings of the 33rd Annual Meeting, Cambridge, Mass., USA, Association for Computational Linguistics, pages 16-23, 1995; and Kempe and Karttunen, "Parallel replacement in finite-state calculus", Proceedings of the 16th International Conference on Computational Linguistics (CoLing), volume 2, pages 622-627, Copenhagen, Denmark, ACL, 1996.

In addition, it will be appreciated by those skilled in the art that the forging specification provides the following advantages that are difficult to obtain using 1-tape or 2-tape automata: (a) a simplified description, implementation, modification, and maintenance of a sequence of NLP tasks (as described for example in section D.1); and (b) the ability to execute a sequence of NLP tasks in a single tool via an end-user interface enabled for performing the operations on automata described herein.

Using the foregoing specification, the invention may be implemented as a machine (or system), process (or method), or article of manufacture by using standard programming and/or engineering techniques to produce programming software, firmware, hardware, or any combination thereof. It will be appreciated by those skilled in the art that the flow diagrams described in the specification are meant to provide an understanding of different possible embodiments of the invention. As such, alternative ordering of the steps, performing one or more steps in parallel, and/or performing additional or fewer steps may be done in alternative embodiments of the invention.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. In a system for processing natural language, a method for intersecting tapes of a first multi-tape automaton (MTA) and a second MTA, with each MTA having a plurality of tapes and a plurality of paths, comprising:
    (a) computing a cross-product MTA using the first MTA and the second MTA;
    (b) generating string tuples for paths of the cross-product MTA;
    (c) for each string tuple generated at (b), evaluating whether the string of a first tape equals the string of a second tape;
    (d) for each string tuple evaluated at (c) having equal strings at the first and second tapes, retaining the corresponding string tuple in the cross-product MTA;
    (e) for each string tuple evaluated at (c) having unequal strings at the first and second tapes, restructuring the cross-product MTA to remove the corresponding string tuple;
    (f) removing redundant strings in the string tuples retained in the cross-product MTA at (d) to produce an output MTA.

2. The method according to claim 1, wherein (f) comprises removing redundant strings in the string tuples retained in the cross-product MTA at (d) to produce an output MTA that preserves at least one other tape besides one of the first and second tapes of the cross-product MTA without modification.

3. The method according to claim 2, further comprising repeating (a)-(f) in a cascade of a first transduction and a second transduction, wherein at least one of the tapes preserved after completing the first transduction is accessed to perform the second transduction.

4. The method according to claim 3, wherein each MTA has weighted transitions.

5. The method according to claim 4, wherein the weights transitions of each MTA are probabilities.

6. The method according to claim 1, wherein the first MTA encodes strings in a first natural language and the second MTA encodes strings in a second natural language.

7. The method according to claim 6, wherein the output MTA identifies related strings of the first natural language and the second natural language.

8. The method according to claim 1, further comprising repeating (b)-(e) for a first other tape and a second other tape, wherein at least one of the first other tape and the second other tape is not the first tape or the second tape.

9. The method according to claim 1, further comprising performing (a)-(e) in a concurrent series of operations that integrates (a) while performing (b)-(e).

10. The method according to claim 9, wherein the cross-product MTA has at least one epsilon loop along a path defined by the first tape or the second tape.

11. The method according to claim 1, wherein (a)-(f) are performed with a single composition of the first MTA and the second MTA that preserves at least one other tape besides one of the first and second tapes of the cross-product MTA without modification.

12. In a system for processing natural language, a method for intersecting tapes of a first multi-tape automaton (MTA) and a second MTA, with each MTA having a plurality of tapes and a plurality of paths, comprising:
   (a) composing the first MTA and the second MTA by intersecting a first tape of the first MTA with a first tape of the second MTA to produce an output MTA; the first tape of the first MTA and the first tape of the second MTA corresponding to a first intersected tape and a second intersected tape of the output MTA, respectively; and
   (b) removing at least one of the first and the second intersected tapes from the output MTA while preserving all its other tapes without modification.

13. The method according to claim 12, wherein (a) further comprises:
   (a1) computing a cross-product MTA using the first MTA and the second MTA;
   (a2) generating string tuples for paths of the cross-product MTA;
   (a3) for each string tuple generated at (a2), evaluating whether the string of the first intersected tape equals the string of the second intersected tape;
   (a4) for each string tuple evaluated at (a3) having equal strings at the first and second intersected tapes, retaining the corresponding string tuple in the cross-product MTA;
   (a5) for each string tuple evaluated at (a3) having unequal strings at the first and second intersected tapes, restructuring the cross-product MTA to remove the corresponding string tuple; and
   wherein (b) further comprises removing redundant strings in string tuples retained in the cross-product MTA at (a4) to produce the output MTA.

14. The method according to claim 13, further comprising repeating (a2)-(a5) for at least one or both of a second tape of the first MTA and a second tape of the second MTA.

15. The method according to claim 12, further comprising:
   intersecting at least one or both of a second tape of the first MTA and a second tape of the second MTA corresponding to a third intersected tape and a fourth intersected tape of the output MTA, respectively; and
   removing at (b) at least one of the third and the fourth intersected tapes from the output MTA.

16. The method according to claim 12, wherein the output MTA has weighted transitions.

17. The method according to claim 12, further comprising repeating (a)-(b) in a cascade of a first transduction and a second transduction, where at least one of the tapes preserved after completing the first transduction is accessed to perform the second transduction.

18. The method according to claim 12, wherein (a)-(b) is performed to carry out one or more of morphological analysis, part-of-speech tagging, disambiguation, and entity extraction.

* * * * *